(12) United States Patent
Ludovici et al.

(10) Patent No.: US 8,256,786 B2
(45) Date of Patent: Sep. 4, 2012

(54) ADJUSTABLE FRONT CASTER MOUNT ASSEMBLY FOR A WHEELCHAIR

(75) Inventors: Alan N Ludovici, Kennewick, WA (US); Doug Garven, Pasco, WA (US)

(73) Assignee: Tisport, LLC, Pasco, WA (US)

( * ) Notice: Subject to any disclaimer, the term of this patent is extended or adjusted under 35 U.S.C. 154(b) by 132 days.

(21) Appl. No.: 12/721,554

(22) Filed: Mar. 10, 2010

(65) Prior Publication Data

US 2011/0221161 A1 Sep. 15, 2011

Related U.S. Application Data

(60) Provisional application No. 61/312,239, filed on Mar. 9, 2010.

(51) Int. Cl.
*B62M 1/14* (2006.01)
(52) U.S. Cl. ............... 280/250.1; 280/86.751; 16/19; 16/18 R
(58) Field of Classification Search .......... None
See application file for complete search history.

(56) References Cited

U.S. PATENT DOCUMENTS

| | | | |
|---|---|---|---|
| 5,507,513 | A | 4/1996 | Peters et al. |
| 6,728,991 | B2 * | 5/2004 | Lai et al. ............ 16/19 |
| 7,131,706 | B2 | 11/2006 | Kamen et al. |
| 7,231,689 | B2 * | 6/2007 | Scheiber et al. ............ 16/19 |
| 7,520,518 | B2 * | 4/2009 | Peterson et al. ........ 280/250.1 |
| 7,828,310 | B2 | 11/2010 | Vreeswijk et al. |
| 7,832,745 | B2 * | 11/2010 | Rauch, Jr. ............ 280/86 |
| 2006/0087098 | A1 | 4/2006 | Peterson et al. |
| 2007/0018426 | A1 | 1/2007 | Willis |
| 2007/0102894 | A1 * | 5/2007 | Derisi ............ 280/86.751 |
| 2007/0170699 | A1 | 7/2007 | Li et al. |
| 2009/0295111 | A1 * | 12/2009 | O'Rourke ............ 280/86.751 |
| 2010/0102529 | A1 | 4/2010 | Lindenkamp et al. |
| 2010/0132156 | A1 * | 6/2010 | Morris ............ 16/19 |
| 2011/0221162 | A1 | 9/2011 | Ludovici et al. |

OTHER PUBLICATIONS

Ti Lite Parts Manual, Section 8, Casters, Forks and Caster Caps, pp. 8-1.1.1, 8-1.1.2, 8-1.3, 8-1.4, 8-1.5, 8-1.6, 8-1.7, 8-1.8, 8-1.9, 8-2.1, 8-2.2, 8-2.3, 8-2.4, 8-2.5, 8-2.6, 8-7.2, 8-8, and 8-8.1, publicly disclosed more than one year before Mar. 9, 2010.
Information Disclosure Statement Transmittal Letter filed herewith on May 14, 2012, 2 pages.
Office Action issued for U.S. Appl. No. 12/721,558, issued Dec. 22, 2011.

* cited by examiner

*Primary Examiner* — Tony Winner
(74) *Attorney, Agent, or Firm* — Davis Wright Tremaine LLP; George C. Rondeau, Jr.; Heather M. Colburn

(57) ABSTRACT

A caster mount assembly for a front caster of a wheelchair. The assembly includes a first rotatable body having a first plurality of non-uniformly spaced apart apertures and a second rotatable body having a second plurality of non-uniformly spaced apart apertures. The first and second rotatable bodies may be rotated relative to one another along a common axis of rotation to align a selected one of the first apertures with a selected one of the second apertures. The first rotatable body is non-rotatably coupled to the second rotatable body by a first coupler after the selected first aperture and second aperture have been aligned. A bearing fork assembly is non-rotatably coupled to the second rotatable body for rotation therewith. The second rotatable body may be rotated to orient an upright pivot pin of the bearing fork assembly substantially perpendicular to a support surface.

25 Claims, 14 Drawing Sheets

ADJUSTABLE FRONT CASTER MOUNT ASSEMBLY FOR A WHEELCHAIR

CROSS REFERENCE TO RELATED APPLICATION(S)

This application claims the benefit of U.S. Provisional Application No. 61/312,239, filed Mar. 9, 2010, which is incorporated herein in its entirety.

BACKGROUND OF THE INVENTION

1. Field of the Invention

The present invention is directed generally to front wheel caster mount assemblies for use with a wheelchair and more particularly to angle adjusting front wheel caster mount assemblies for use with a wheelchair.

2. Description of the Related Art

A typical wheelchair includes a seat supported by a frame resting upon four wheels. A front wheel and a rear wheel are disposed on each side of the wheelchair. The pair of rear wheels may be located under or behind a seat upon which the occupant of the wheelchair is seated. The front wheels are located in front of the rear wheels and pivot to facilitate steering. Generally, the rear wheels are mounted to opposite sides of the frame by an axle assembly. Generally, the front wheels are mounted to opposite sides of the frame by a bearing fork assembly.

In many wheelchair designs, the front wheels have a significantly smaller radius than the rear wheels. Therefore, the axles of the rear wheels are typically mounted to the frame at locations that are elevated from the locations of attachment of the axles of the front wheels to the frame. In this manner, an angle of the frame relative to the ground may be determined by the locations in which the front and rear wheels are mounted to the frame and the diameter of the front and rear wheels.

An angle is defined between the frame and the ground. For front and rear wheels each having a predetermined and substantially constant diameter, the angle may be determined by the attachment location of the front wheels relative to the attachment location of the rear wheels. Because it may be desirable to level the seat relative to the ground (i.e., adjust the angle of the seat relative to the ground to approximately zero degrees) in some wheelchair designs, the vertical and/or horizontal positions of the rear and/or front wheels relative to the frame may be adjusted to achieve a level seat position.

Each of the front wheels is mounted to the longitudinal frame member by a bearing fork assembly. In many wheelchair designs, the bearing fork assembly includes a bearing fork and an upright pivot pin, which may be implemented as a stem bolt. The bearing fork is coupled to an axle about which the front wheel rotates. The upright pivot pin pivotably couples the bearing fork to the frame. To steer the wheelchair, the bearing fork pivots about the upright pivot pin.

As a general rule, it is desirable to orient the upright pivot pin generally perpendicular to the ground. If the upright pivot pin is not perpendicular to the ground, the front wheels may not pivot properly. Further, because the front wheels typically pivot to facilitate steering the wheelchair, if the upright pivot pin is not perpendicular to the ground, the front wheel may not rotate properly and the steering of the wheelchair may be impaired.

A wheelchair may require adjustment to fit a particular user. For example, many wheelchairs allow the user to adjust the height of the seat by vertically moving the location where the frame attaches to the rear axles. This adjustment will typically modify the angle of the seat relative to the ground. Similarly, some wheelchair designs allow a user to move the rear wheels longitudinally forward and backward relative to the seat, which may also modify the angle of the seat.

The ability to change the angle of the seat is important to proper positioning of the wheelchair occupant. Increasing the angle of the seat (i.e., increasing the height of the front of the seat relative to the back of the seat) allows gravity to help prevent the occupant of the wheelchair, who will likely have limited or no lower extremity function and perhaps limited trunk muscular control, from sliding out of the seat.

Often, finding the correct angle of the seat is a matter of trial and error. Over time, the most desirable angle may change. For example, a particular wheelchair user may have a degenerative disease that requires increasing the angle over time. Alternatively, as people age they become more susceptible to pressure sores. By reducing the angle of the seat, it is possible to reduce the pressure on the buttocks.

Unfortunately, if the angle of the frame relative to the ground is changed, the angle of the upright pivot pins of the bearing fork assemblies may require adjustment to reorient the upright pivot pins perpendicular to the ground. Therefore, a need exists for devices that rotate the upright pivot pins to which the bearing forks are mounted to position the upright pivot pins perpendicular to the ground.

The bearing fork may have one tine (a mono-fork) or two tines. In many prior art mono-fork designs, a proximal end of an axle is connected to the tine by a fastener that passes through a transverse hole formed in the proximal end of the axle. Unfortunately, the transverse hole weakens the axle and is often the location of a failure. Therefore, a mono-fork design that does not include a transverse hole is desirable.

The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
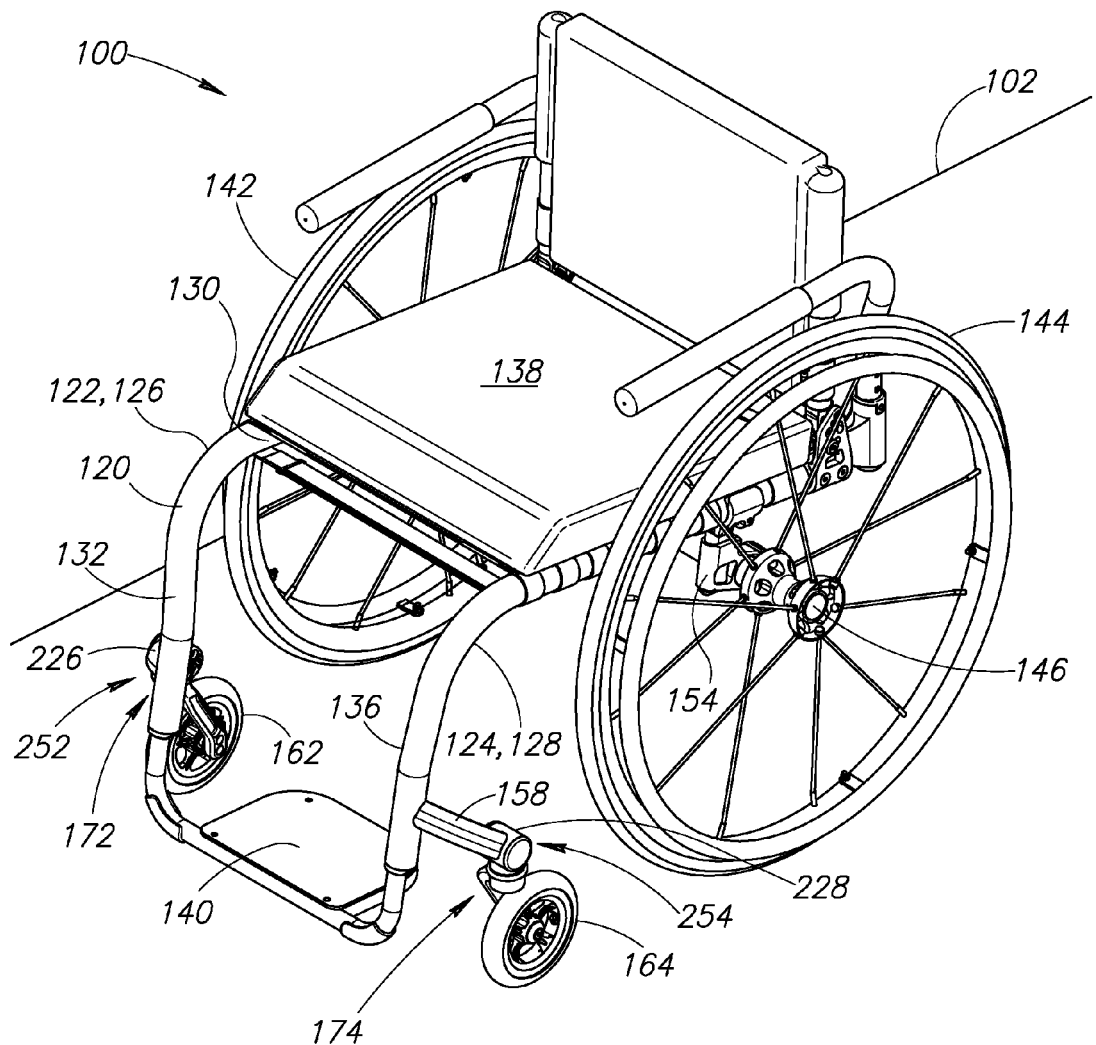
FIG. 1 is an elevational perspective view of a wheelchair.
Figure 2:
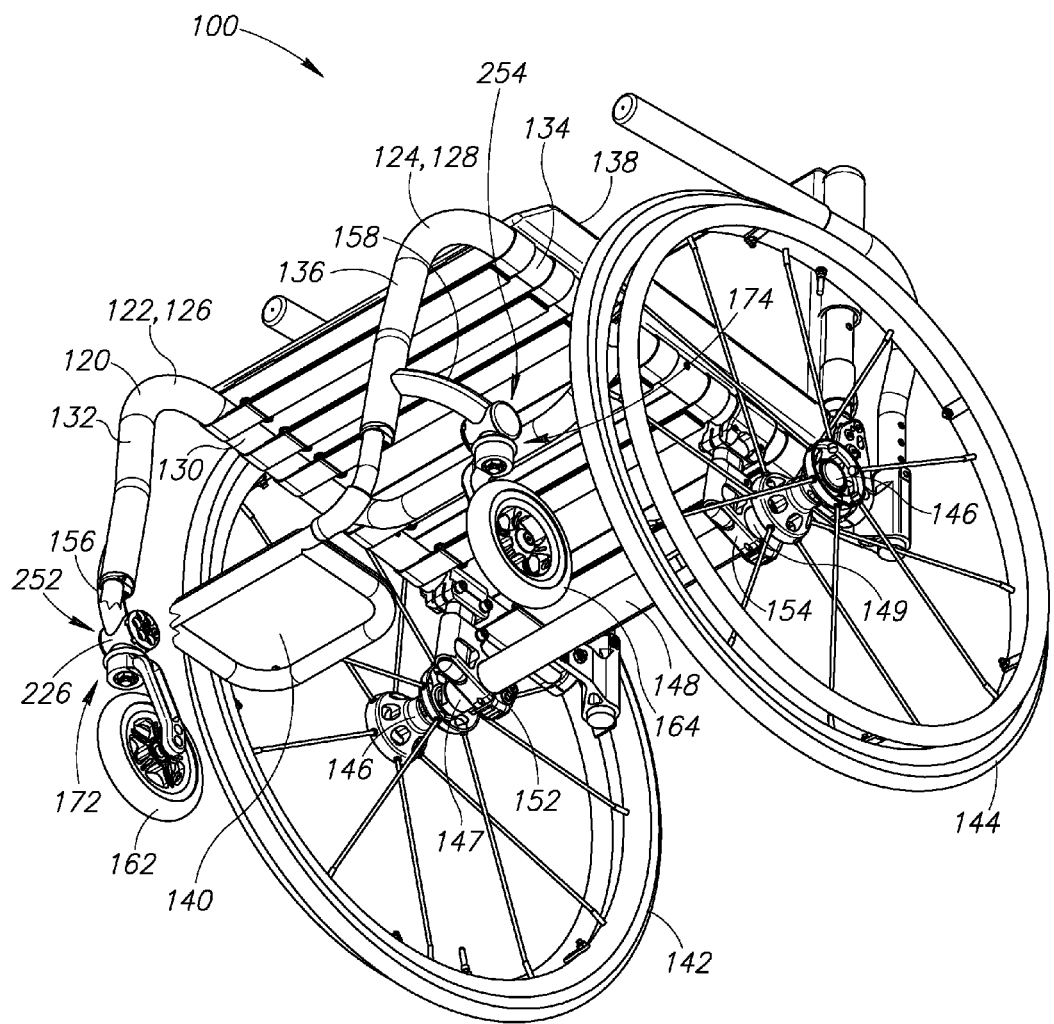
FIG. 2 is an perspective view of an underside of the wheelchair of FIG. 1.

FIG. 1 is an elevational view of an exemplary wheelchair 100 supported by a support surface 102 (e.g., the ground). FIG. 2 provides a view of the underside of the wheelchair 100. Referring to FIGS. 1 and 2, the wheelchair 100 includes a frame 120 having a right side portion 122 and a left side portion 124 as perceived by an occupant of the wheelchair 100. Referring to FIG. 2, in the embodiment illustrated, the right side portion 122 includes a right frame member 126 having a generally horizontally extending portion 130 and a generally downwardly extending portion 132. The right frame member 126 may be implemented as hollow tube bent to define the portions 130 and 132. The left side portion 124 includes a left frame member 128 having a generally horizontally extending portion 134 and a generally downwardly extending portion 136. The left frame member 128 may be implemented as hollow tube bent to define the portions 134 and 136. The horizontally extending portions 130 and 134 of the right and left frame members 126 and 128, respectively, are illustrated as being substantially parallel to one another.

Referring to FIG. 1, the wheelchair 100 includes a seat 138 supported by the frame 120. In the embodiment illustrated, the seat 138 is coupled to the right and left support members 126 and 128 and extends therebetween. Optionally, a footrest 140 may be coupled to the frame 120 in any manner known in the art. In the embodiment illustrated, the footrest 140 is coupled to the generally downwardly extending portions 132 and 136 of the right and left frame members 126 and 128, respectively.

The wheelchair 100 has a right rear wheel 142 and a left rear wheel 144. The right and left rear wheels 142 and 144 each rotate relative to the frame 120 about an axle assembly 146. The axle assembly 146 of the right rear wheel 142 is coupled to a first end 147 of a camber tube 148 and the axle assembly 146 of the left rear wheel 144 is coupled to a second end 149 of the camber tube 148.

Referring to FIG. 2, the first end 147 of the camber tube 148 is coupled to the right side portion 122 of the frame 120 by a right rear wheel mounting assembly 152 and the second end 149 of the camber tube 148 is coupled to the left side portion 124 of the frame 120 by a left rear wheel mounting assembly 154. The right and left rear wheel mounting assemblies 152 and 154 may be constructed in any manner known in the art for coupling the camber tube 148 to the frame 120 and the present application is not limited to the exemplary right and left rear axle assemblies 152 and 154 depicted in the figures. Further, the present application is not limited to use with wheelchairs including a camber tube. For example, the wheelchair 100 may be implemented as a folding wheelchair without a camber tube extending between the right and left sides of the wheelchair.

Returning to FIG. 1, the wheelchair 100 has a right front wheel 162 attached to the right side portion 122 of the frame 120 and a left front wheel 164 attached to the left side portion 124 of the frame 120. The left and right front wheels 162 and 164 are substantially identical or mirror images of one another. Therefore, for the sake of brevity, only the left front wheel 164 will be described in more detail. Returning to FIGS. 3A and 3B, the left front wheel 164 may include one or more bearings 165. By way of a non-limiting examples, each of the bearings 165 (see FIGS. 3A and 3B) may have an opening 167. Depending upon the implementation details, the opening 167 may have a diameter of about ⅜ inches (0.375 inches).

In the embodiment illustrated, a right connecting strut 156 (illustrated in FIG. 2) is connected to the generally downwardly extending portion 132 of the right frame member 126 and a left connecting strut 158 is connected to the generally downwardly extending portion 136 of the left frame member 128. The right and left connecting struts 156 and 158 are illustrated as being mirror images of one another.

In the embodiment illustrated, the right front wheel 162 is coupled to the right connecting strut 156 by a right bearing fork assembly 172 and the left front wheel 164 is coupled to the left connecting strut 158 by a left bearing fork assembly 174. The right and left bearing fork assemblies 172 and 174 are mirror images of one another. Therefore, for the sake of brevity, only the left bearing fork assembly 174 will be described in detail.

Figure 3A:
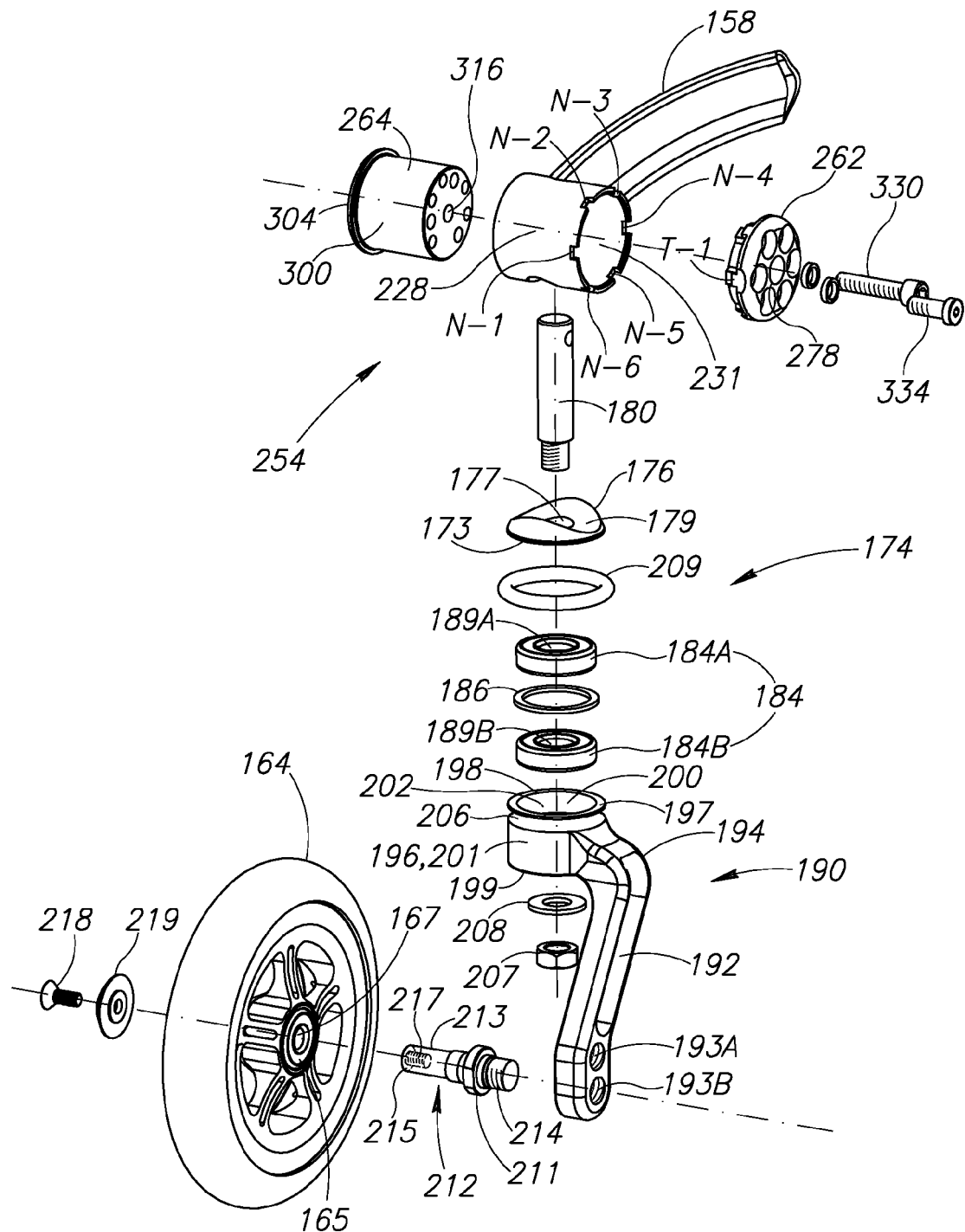
FIG. 3A is an exploded perspective view of a left bearing fork assembly and a left angle adjusting caster mount assembly of the wheelchair of FIG. 1.
Figure 3B:
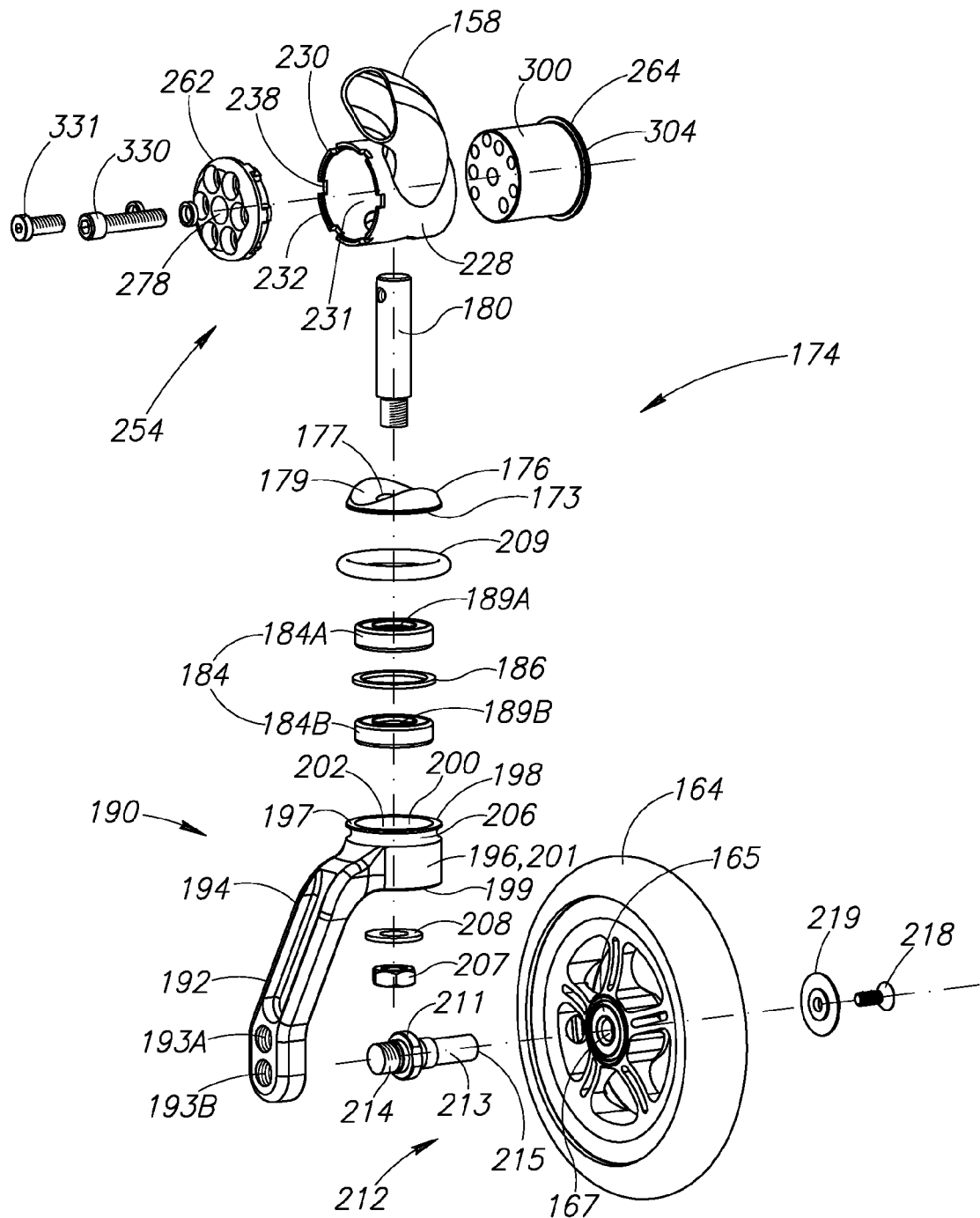
FIG. 3B is an exploded perspective view the left bearing fork assembly and the left angle adjusting caster mount assembly of the wheelchair of FIG. 1.

Referring to FIGS. 3A and 3B, the left bearing fork assembly 174 includes a top cap 176, an upright pivot pin 180, one or more bearings 184, an optional retaining ring 186, and a fork 190. The top cap 176 may be generally ring-shaped having a central aperture 177. The top cap 176 may have a contoured upper surface 179 and a lower portion 173 opposite the contoured upper surface 179.

Figure 4:
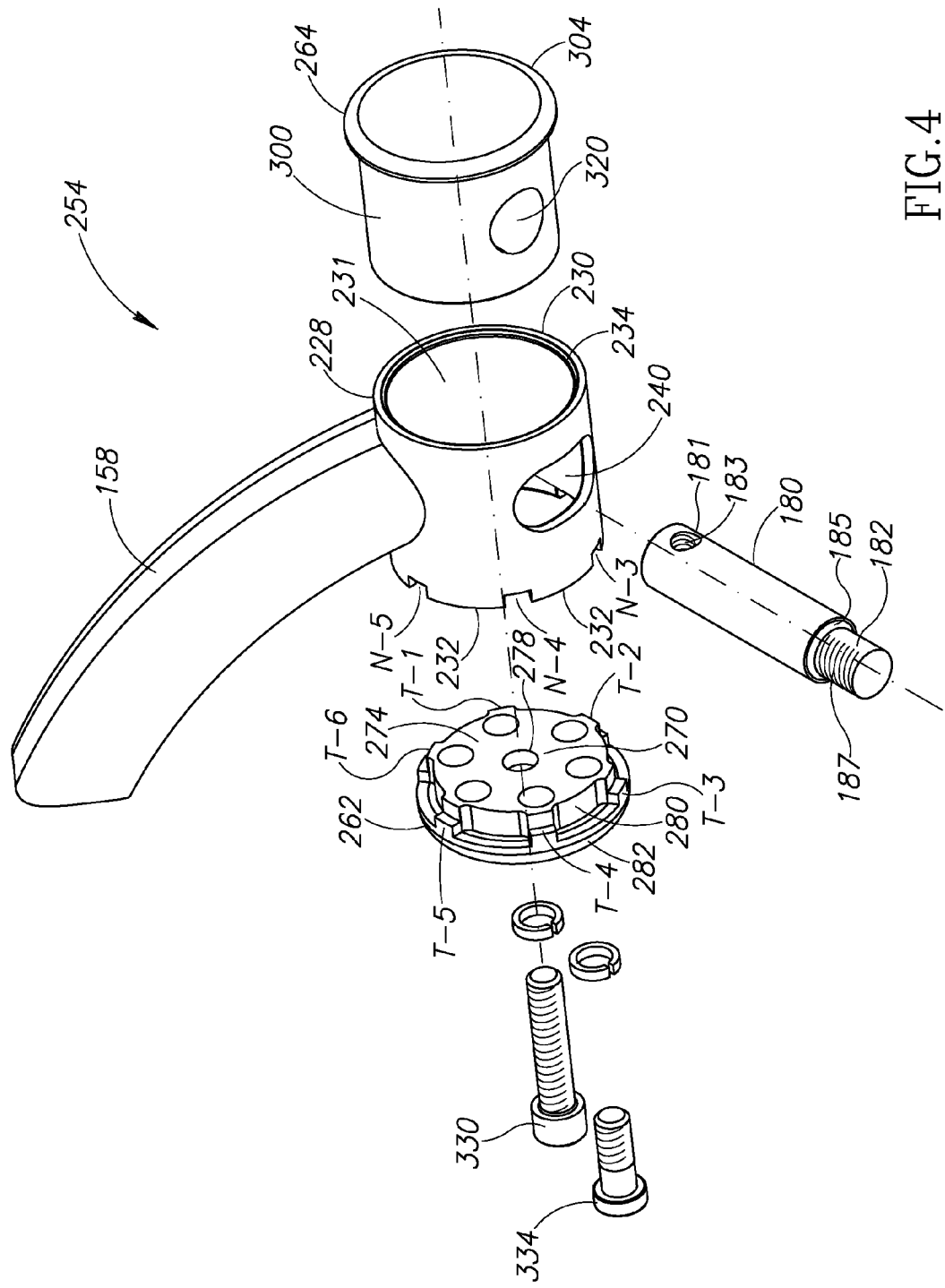
FIG. 4 is an enlarged exploded perspective view the left angle adjusting caster mount assembly of the wheelchair of FIG. 1.

Turning to FIG. 4, the upright pivot pin 180 may be generally cylindrical in shape with a circular cross-sectional shape. The upright pivot pin 180 has a first end portion 181 opposite a second end portion 182. A transverse threaded through-hole 183 is formed in the first end portion 181. The second end portion 182 may be relieved relative to the first end portion 181 to define an overhanging stop wall 185. Outside threads 187 are disposed about the second end portion 182.

In the embodiment illustrated in FIGS. 3A and 3B, the bearings 184 include a first bearing 184A and a second bearing 184B. The bearings 184A and 184B may be ring-shaped having centrally positioned openings 189A and 189B. The upright pivot pin 180 may pass through the openings 189A and 189B. The optional retaining ring 186 may be disposed between the bearings 184A and 184B.

As illustrated in FIGS. 1-3B, 5, and 11-17, the fork 190 may include a single tine 192. In such embodiments, the fork 190 is referred to as a mono-fork 194. At least one threaded aperture (e.g., threaded apertures 193A and 193B) is formed in the tine 192. As is apparent to those of ordinary skill in the art, inside threads have a maximum diameter and a minimum diameter. Similarly, outside threads also have a maximum diameter and a minimum diameter.

Figure 3C:
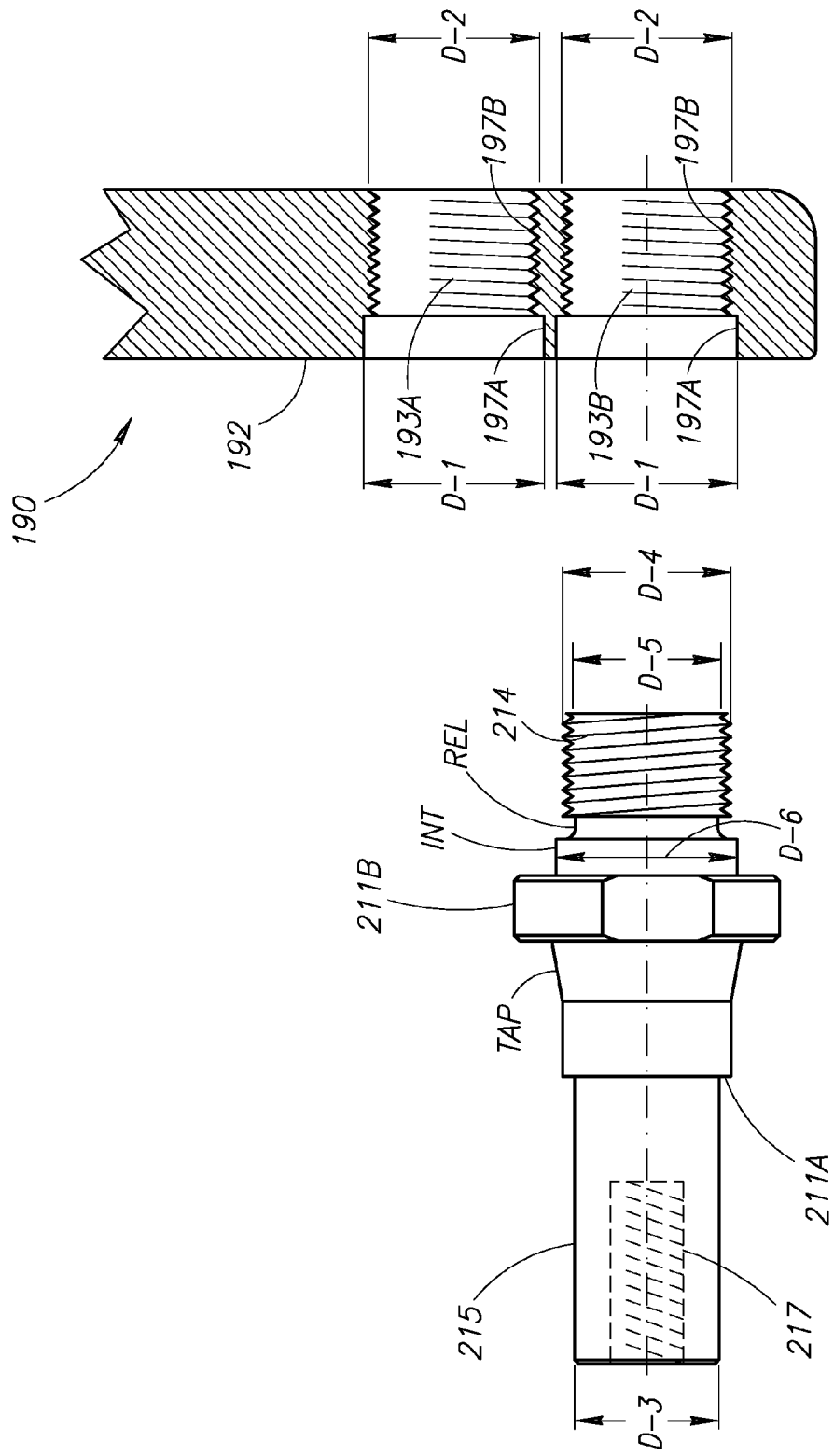
FIG. 3C is an exploded side view of an axle and a section view of a tine of a fork of the left bearing fork assembly of FIGS. 3A and 3B.

The tine 192 illustrated in FIG. 3C includes the threaded apertures 193A and 193B. Each of the threaded apertures 193A and 193B has a larger diameter portion 197A without threads adjacent a smaller diameter threaded portion 197B. The larger diameter portion 197A has a diameter "D-1" and the smaller diameter portion 197B has a maximum diameter "D-2." The diameter "D-1" is larger than the diameter "D-2." By way of a non-limiting example, the diameter "D-1" may be about 0.469 inches.

Figure 5:
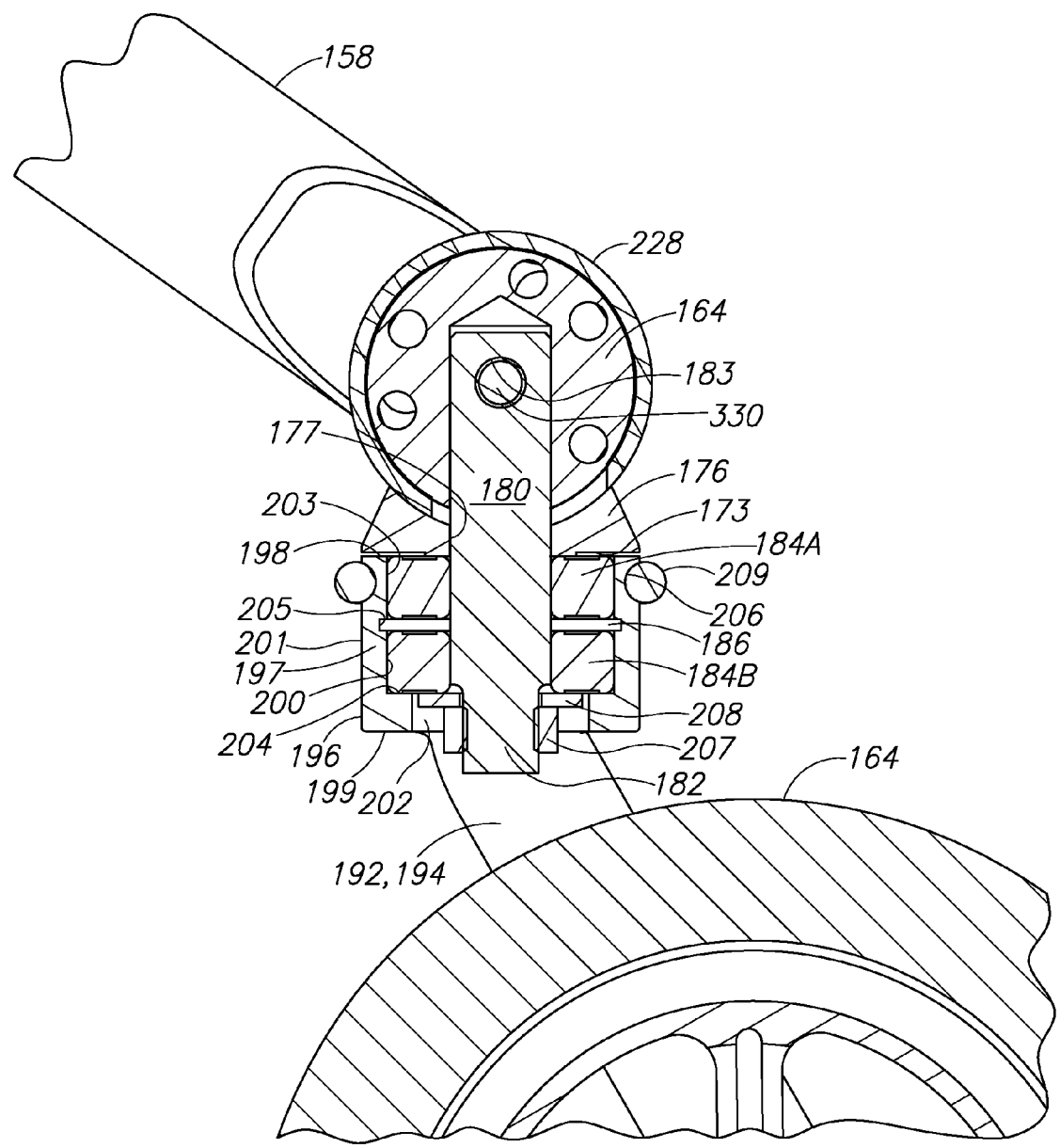
FIG. 5 is a sectional view of the left bearing fork assembly and the left angle adjusting caster mount assembly of the wheelchair of FIG. 1.

The mono-fork 194 includes a collar portion 196 connected to the tine 192. Referring to FIG. 5, the collar portion 196 has a continuous sidewall 197 having an open upper end 198 and an open lower end 199. The sidewall 197 has an inwardly facing surface 200 opposite an outwardly facing surface 201. The inwardly facing surface 200 defines a hollow interior 202.

Along the inwardly facing surface 200, a relieved portion 203 is formed in the sidewall 197. The relieved portion 203 extends downwardly from the open upper end 198 and terminates before reaching the open lower end 199. The relieved portion 203 is sized and shaped to receive the bearings 184 and the optional retaining ring 186. A stop wall 204 is formed along the bottom of the relieved portion 203 above the open lower end 199. The bearings 184 rest upon the stop wall 204 when the bearings 184 are received inside the relieved portion 203. Optionally, an interior groove 205 is formed in the relieved portion 203. The interior groove 205 is configured to receive the optional retaining ring 186 positioned between the bearings 184A and 184B.

An exterior groove 206 is formed in the outwardly facing surface 201 of the sidewall 197 below the open upper end 198. The sidewall 197 is generally cylindrical in shape. The exterior groove 206 extends along the outer circumference of the sidewall 197. In the embodiment illustrated in FIGS. 3A and 3B, the exterior groove 206 is positioned between the open upper end 198 and the tine 192.

The lower portion 173 of the top cap 178 is configured to rest upon the open upper end 198 of the sidewall 197. In the embodiment illustrated, the upright pivot pin 180 extends through the central aperture 177 of the top cap 176 and into the open upper end 198 of the sidewall 197. The upright pivot pin 180 passes through the opening 189A of the bearing 184A, the optional retaining ring 186, and the opening 189B of the bearing 184B, to exit the hollow interior 202 (see FIG. 5) through the open lower end 199. The collar portion 196 is configured to rotate about the upright pivot pin 180, which is aligned along a steering axis. Thus, the fork 190 is rotatable about a steering axis.

A fastener 207 (such as a nut) is coupled to the second end portion 182 of the upright pivot pin 180 to retain it inside the hollow interior 202 (see FIG. 5) of the collar portion 196. In the embodiment illustrated, the fastener 207 is implemented as a nut configured to threadedly engage the outside threads 187 (see FIG. 4) formed on the second end portion 182 of the upright pivot pin 180. A washer 208 may be disposed between the fastener 207 and the open lower end 199 of the sidewall 197. When the fastener 207 is tightened on the second end portion 182 of the upright pivot pin 180, the washer 208 bears against the bearing 184B, which in turn, may bear against the optional retaining ring 186. Because the optional retaining ring 186 is retained inside the interior groove 205, the retaining ring 186 may prevent the upright pivot pin 180 from exiting the hollow interior 202 of the collar portion 196 through the open upper end 198.

A bumper 209 is positioned inside the exterior groove 206. By way of a non-limiting example, the bumper 209 may be implemented as an o-ring. The bumper 209 is positioned to protect the left bearing fork assembly 174 from damage caused by collisions with objects such as walls, doors, steps, and the like. The bumper 209 may help prevent damage to such other objects from impact with the left bearing fork assembly 174.

Returning to FIGS. 3A and 3B, the left front wheel 164 is rotatably connected to the mono-fork 194 by a left axle assembly 212. The left axle assembly 212 includes an axle 213 having a threaded proximal end portion 214 opposite a distal end portion 215.

Turning to FIG. 3C, the distal end portion 215 may be generally cylindrical in shape with a circular cross-sectional shape. By way of a non-limiting example, the distal end portion 215 may have a diameter "D-3" of about 0.374 inches. The opening 167 (see FIGS. 3A and 3B) of the bearings 165 (see FIGS. 3A and 3B) is configured to receive the distal end portion 215 of the axle 213. The opening 167 may have a diameter of about ⅜ inches (0.375 inches).

Turning to FIG. 3C, the threaded proximal end portion 214 has a maximum diameter "D-4" and a minimum diameter "D-5." In the embodiment illustrated, the minimum diameter "D-5" is larger than the diameter "D-3" of the distal end portion 215. This configuration may improve the strength of the axle 213 where the axle 213 is threaded into the fork 192. By way of a non-limiting example, the maximum diameter "D-4" may be about 0.437 inches.

The axle 213 may include a relieved portion "REL" adjacent the threaded proximal end portion 214. By way of a non-limiting example, the relieved portion "REL" may have a diameter of about 0.370 inches. The relieved portion "REL" may be configured to relieve mechanical stress in the threaded proximal end portion 214 caused by the threading of the proximal end portion 214 in to a selected one of the threaded apertures 193A or 193B.

The axle 213 may include a first stop portion 211A adjacent the distal end portion 215 configured to limit the lateral movement of the left front wheel 164 along the distal end portion 215. The axle 213 may also include a second stop portion 211B having a larger diameter than the other portions of the axle 213. The second stop portion 211B is configured to contact a portion of the tine 192 adjacent the selected one of the threaded apertures 193A or 193B to halt the inward movement of the threaded proximal end portion 214 into the selected aperture.

An intermediate portion "INT" may be disposed between the relieved portion "INT" and the second stop portion 211B. The intermediate portion "INT" may have a diameter "D-6" that is approximately equal to the diameter "D-1" of the larger diameter portion 197A.

The axle 213 may include a tapered portion "TAP" between the first and second stop portions 211A and 211B.

The axle 213 may be substantially solid with an inwardly longitudinally extending threaded channel 217 having inside threads formed in the distal end portion 215. The threaded proximal end portion 214 is configured to be threaded into a selected one of the threaded apertures 193A or 193B formed in the tine 192.

As discussed above, in the embodiment illustrated, each of the threaded apertures 193A and 193B includes the larger diameter unthreaded portion 197A adjacent the smaller diameter threaded portion 197B. The threaded proximal end portion 214 is inserted through the larger diameter portion 197A and threaded into the smaller diameter portion 197B of the selected one of the threaded apertures 193A or 193B. When fully threaded into the smaller diameter portion 197B, the intermediate portion "INT" (which has approximately the same diameter as the larger diameter portion 197A) is effectively press fit or forced into the larger diameter portion 197A of the selected one of the threaded apertures 193A or 193B. This configuration is substantially stronger than a configuration in which the axle 213 is simply threaded into the mono-fork 194 without the press fit.

The axle 213 may be configured to have greater strength than prior art axles used with other mono-forks. Typically, the location of greatest stress along the axle 213 occurs at the junction of the axle 213 with the fork 192. The second stop portion 211B provides an increased amount of mass at or near that location, which improves the strength of the axle 213. Other aspects of the axle 213 that alone and in combination with other features may increase the strength of the axle 213 include the press fit between the intermediate portion "INT" and the larger diameter portion 197A, and the threaded proximal end portion 214 having the minimum diameter "D-5" that is larger than the diameter "D-3" of the distal end portion 215. In particular implementations, all or a subset of the above strength improving features may be incorporated into the axle 213 to provide a mono-fork and axle combination that is substantially stronger than prior art mono-fork and axle combinations.

The threaded proximal end portion 214 may be permanently bonded inside the selected one of the threaded apertures 193A or 193B. For example, a chemical bonding agent or adhesive, such as LOCTITE® 262 Threadlocker, may be used to permanently bond the threaded proximal end portion 214 inside the selected one of the threaded apertures 193A or 193B.

The left axle assembly 212 also includes a fastener 218 and an end cap 219. The fastener 218 may be implemented as a screw, bolt, and the like. The fastener 218 is configured to be coupled to the distal end portion 215 of the axle 213 and when so coupled to press the end cap 219 against a side portion of the left front wheel 164. In the embodiment illustrated, the fastener 218 has outside threads configured to threadedly engage the threaded channel 217 formed in the distal end portion 215 of the axle 213.

Figure 6:
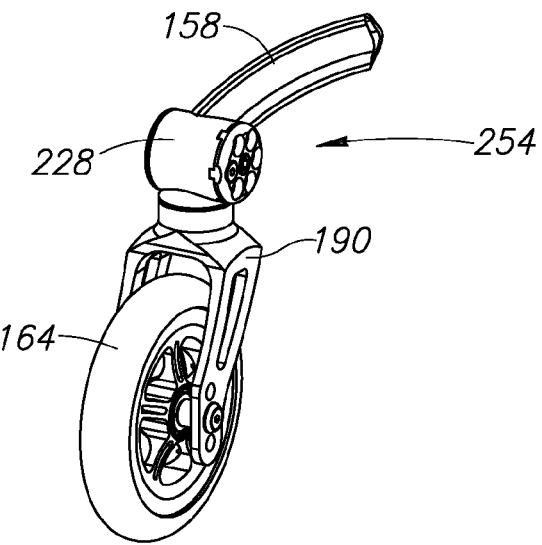
FIG. 6 is a perspective view of an alternate embodiment of a left bearing fork assembly including a conventional fork and axle assembly.
Figure 7:
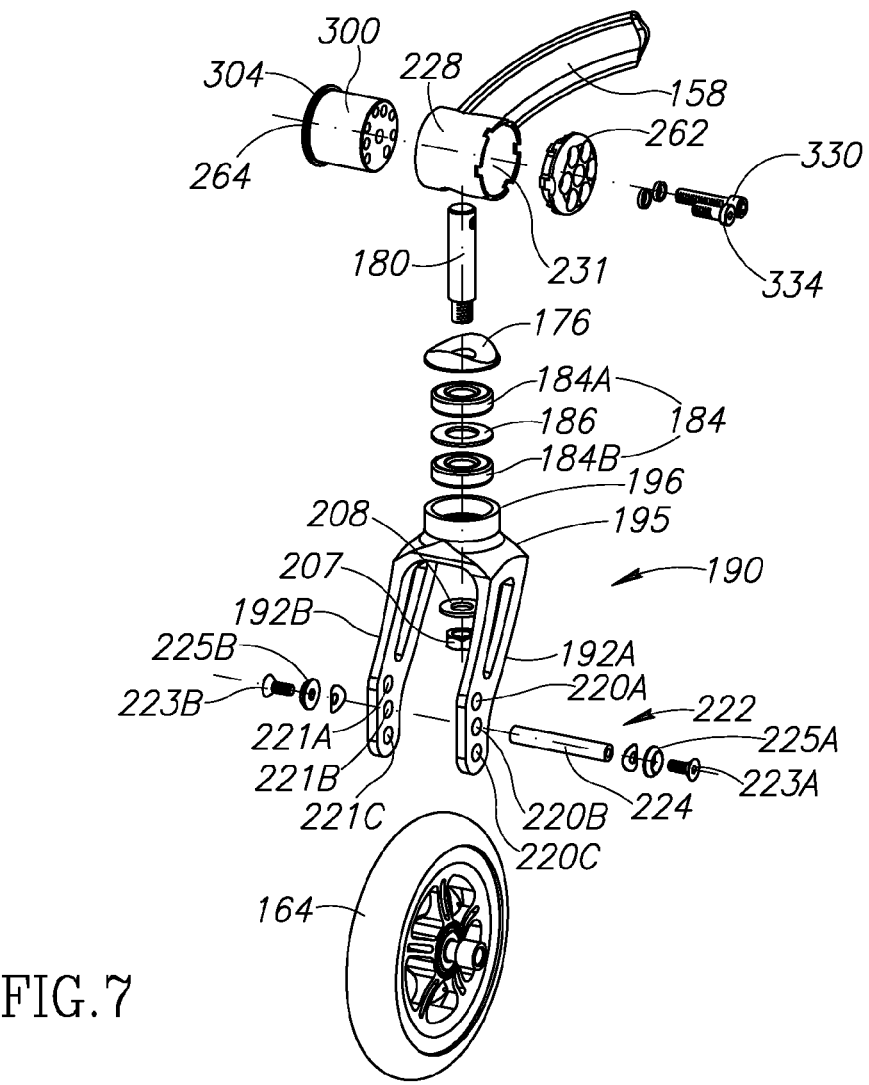
FIG. 7 is an exploded view of the left bearing fork assembly of FIG. 6.

Alternatively, referring to FIGS. 6 and 7, the fork 190 may be implemented as a conventional fork 195 having a first tine 192A spaced apart from a second tine 192B. The first and second tines 192A and 192B are both coupled to the collar portion 196. The first tine 192A includes one or more through-holes (e.g., through-holes 220A-220C) and the second tine 192B includes one or more through-holes (e.g., through-holes 221A-221C) juxtaposed with the through-holes of the first tine 192A. The left front wheel 164 is rotatably connected to the conventional two-tine fork by a conventional left axle assembly 222. The conventional left axle assembly 222 includes an axle 224 configured to be received inside a pair of juxtaposed through-holes (e.g., the through-holes 220A and 221A) formed in the tines 192A and 192B to rotatably couple the left front wheel 164 between the tines 192A and 192B. The conventional left axle assembly 222 may also include a fastener 223A and an end cap 225A for coupling one end of the axle 224 to the tine 192A and a fastener 223B and an end cap 225B for coupling the other end of the axle 224 to the tine 192B. The fasteners 223A and 223B may be substantially similar to the fastener 218. The end caps 225A and 225B may be substantially similar to the end cap 219.

Optionally, referring to FIGS. 1 and 2, a generally horizontally oriented right collar or caster barrel 226 may be coupled to the right connecting strut 156 and a left caster barrel 228 may be coupled to the left connecting strut 158. In the embodiment illustrated in FIGS. 1 and 2, the right connecting strut 156 is curved and extends between the caster barrel 226 and the generally downwardly extending portion 132 of the right frame member 126. Similarly, the left connecting strut 158 is curved and extends between the caster barrel 228 and the generally downwardly extending portion 136 of the right frame member 128.

The caster barrels 226 and 228 are mirror images of one another. Therefore, for the sake of brevity, only the left caster barrel 228 will be described in detail. Referring to FIG. 4, the left caster barrel 228 is generally cylindrically shaped having a continuous sidewall 230 defining a hollow interior 231. As may be seen in FIGS. 3A and 3B, the contoured upper surface 179 of the top cap 176 is configured to mate with the sidewall 230 of the caster barrel 228.

The sidewall 230 has a first open end portion 232 opposite a second open end portion 234. Spaced apart notches or cutout portions "N-1" to "N-6" (see FIG. 3A) are formed in the edge of the sidewall 230 along the first open end portion 232. The left connecting strut 158 is affixed to the sidewall 230. An elongated aperture or slot 240 is formed in the sidewall 230 at a location spaced apart circumferentially from where the left connecting strut 158 is affixed to the sidewall 230. The slot 240 is shaped and sized to allow the upright pivot pin 180 to pass therethrough and to be rotated or pivoted inside the slot 240 forwardly and rearwardly.

Referring to FIG. 2, in embodiments in which the caster barrels 226 and 228 are coupled to the right and left connecting struts 156 and 158, respectively, the right and left bearing fork assemblies 172 and 174 may be connected to the right and left caster barrels 226 and 228, respectively, by right and left angle adjusting caster mount assemblies 252 and 254, respectively. The right and left angle adjusting caster mount assemblies 252 and 254 are mirror images of one another. Therefore, for the sake of brevity, only the left caster mount assembly 254 will be described in detail.

Figure 8:
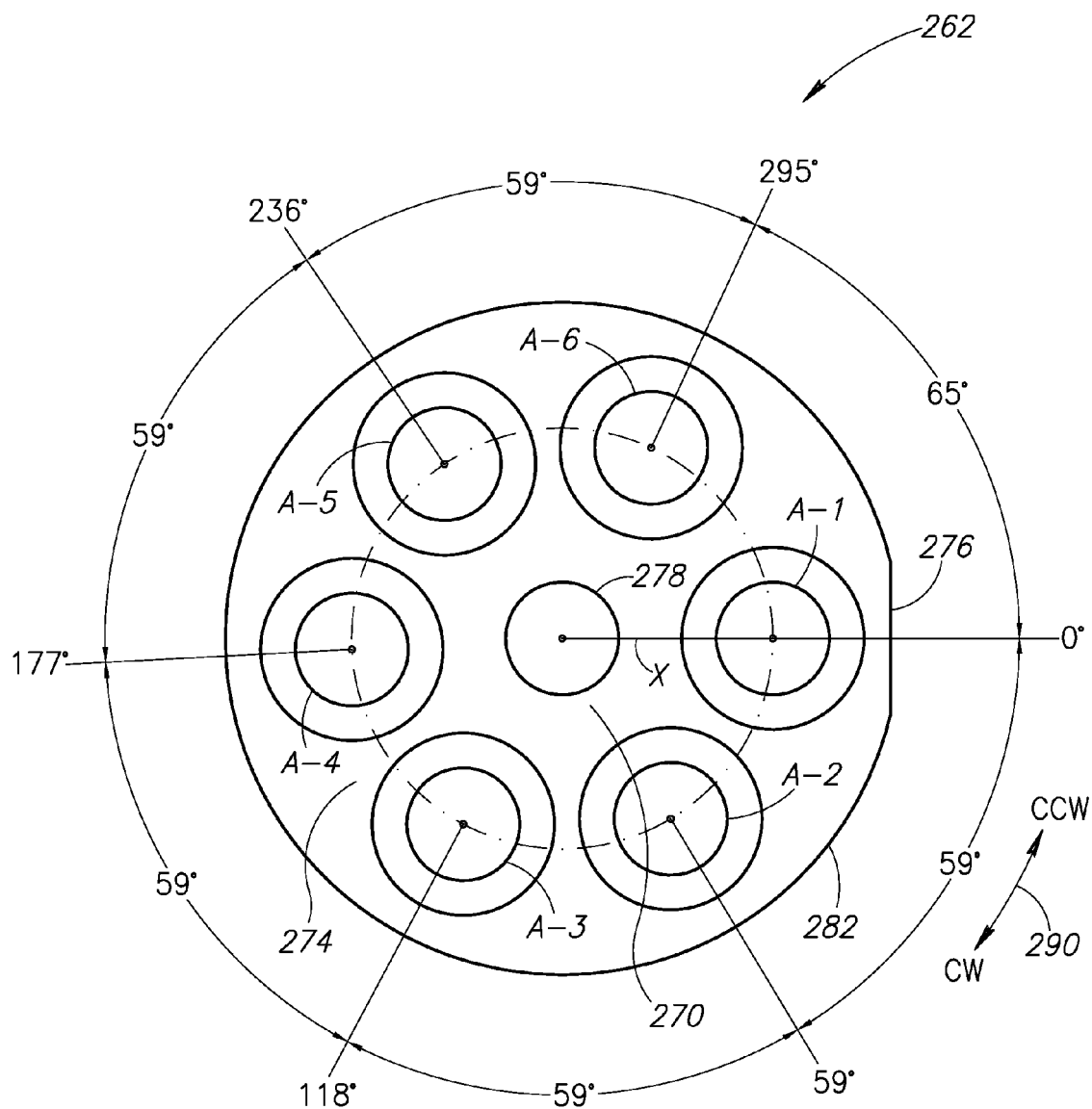
FIG. 8 is a first side view of an inner end cap of the left angle adjusting caster mount assembly of the wheelchair of FIG. 1.

The left caster mount assembly 254 includes an inner end cap 262 and an caster mount 264. Referring to FIG. 4, the inner end cap 262 is generally disc-shaped having a center portion 270 surrounded by a peripheral portion 274. Turning to FIG. 8, a position marker 276 is provided on the peripheral portion 274. In the embodiment illustrated, the position marker 276 has been implemented as a cutout portion formed on the outermost edge of the peripheral portion 274.

A center through-hole 278 is formed in the center portion 270. One or more through-holes (e.g., through-holes "A-1" to "A-6") are formed in the peripheral portion 274. In the embodiment illustrated, six through-holes "A-1" to "A-6" are formed in the peripheral portion 274. The through-holes "A-1" and "A-2" are approximately 59° apart. The through-holes "A-2" and "A-3" are approximately 59° apart. The through-holes "A-3" and "A-4" are approximately 59° apart. The through-holes "A-4" and "A-5" are approximately 59° apart. The through-holes "A-5" and "A-6" are approximately 59° apart. The through-holes "A-1" and "A-6" are approximately 65° apart. Thus, the six through-holes "A-1" to "A-6" are not equally spaced apart. The position marker 276 is illustrated as being positioned adjacent to the through-hole "A-1."

Figure 9:
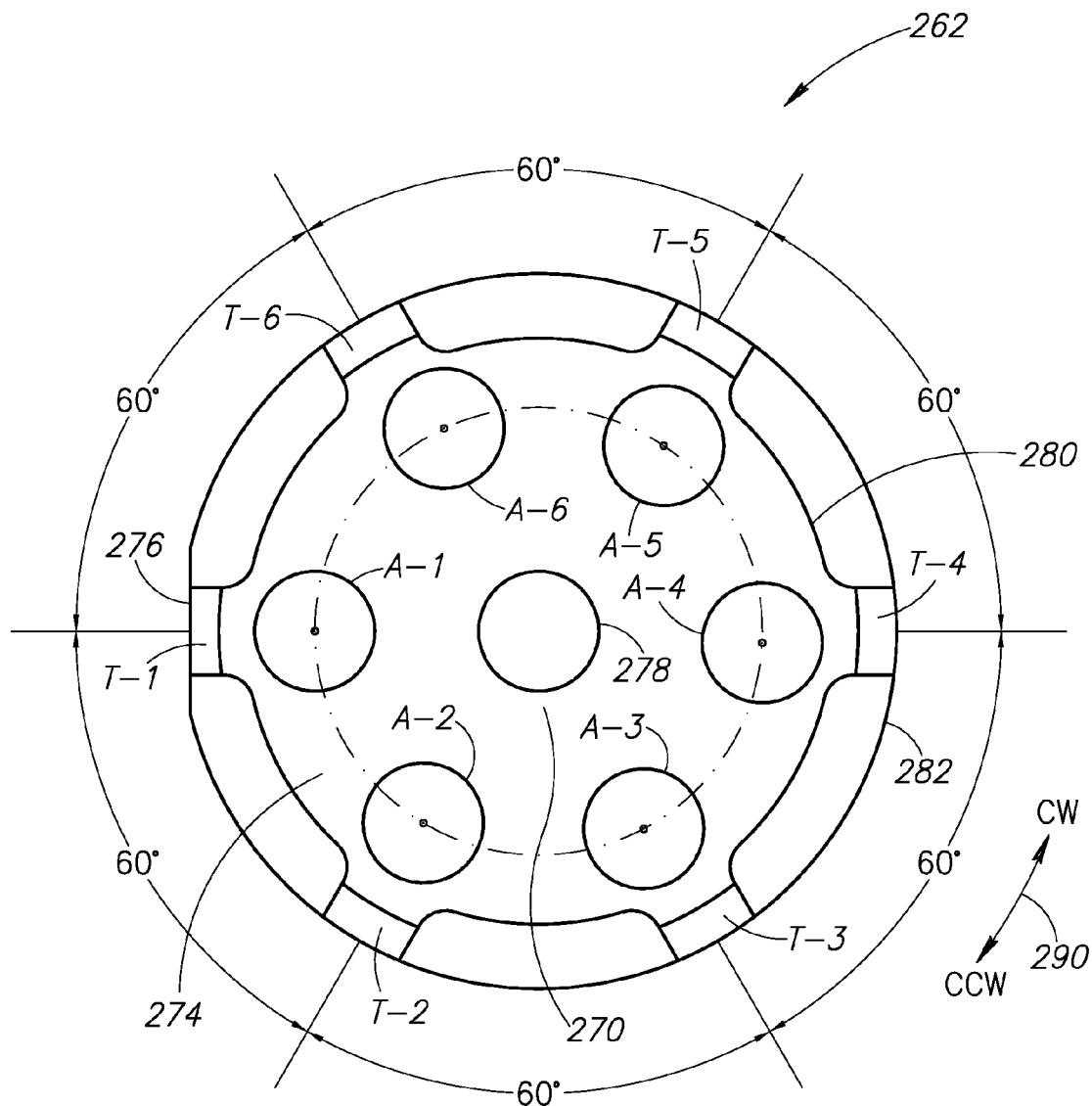
FIG. 9 is a second side view of the inner end cap of the left angle adjusting caster mount assembly of the wheelchair of FIG. 1.

Turning to FIG. 9, the inner end cap 262 has a body portion 280 and a graspable outer portion 282. The body portion 280 is configured to be received inside the first open end portion 232 of the caster barrel 228. When the body portion 280 is received inside the caster barrel 228, the graspable outer portion 282 remains outside the hollow interior 231 defined by the sidewall 230. Thus, the graspable outer portion 282 is accessible to a user. The position marker 276 is formed in the graspable outer portion 282.

The body portion 280 of the inner end cap 262 includes a plurality of outwardly extending teeth or projections (e.g., projections "T-1" to "T-6") arranged circumferentially around the outer edge of the peripheral portion 274. In the embodiment illustrated, the inner end cap 262 includes six equally spaced apart projections "T-1" to "T-6." Thus, in this embodiment, the projections "T-1" to "T-6" are approximately 60° apart. Referring to FIG. 4, the projections "T-1" to "T-6" are configured to be received inside the cutout portions "N-1" to "N-6" of the caster barrel 228. Because the projections "T-1" to "T-6" are equally spaced apart, the inner end cap 262 may be rotated relative to the caster barrel 228 in a clockwise ("CW") direction or a counter-clockwise ("CCW") direction (identified by double headed arrow 290 illustrated in FIGS. 8 and 9) and the projections "T-1" to "T-6" inserted into any of the cutout portions "N-1" to "N-6" of the caster barrel 228.

Because all of the projections "T-1" to "T-6" are inserted into the cutout portions "N-1" to "N-6" at the same time, for the sake of clarity, the positioning of the inner end cap 262 relative to the caster barrel 228 will be described with respect to the position of the projection "T-1." However, as appreciated by those of ordinary skill in the art, when the projection "T-1" is received inside a selected one of the cutout portions "N-1" to "N-6," the other projections "T-2" to "T-6" are received inside corresponding ones of the cutout portions "N-1" to "N-6."

Because the projection "T-1" may be inserted into any of the cutout portions "N-1" to "N-6," in the embodiment illustrated, the inner end cap 262 may be selectively attached to the caster barrel 228 in one of six positions. For ease of illustration, the positions will be described as follows:

Position 1: the projection "T-1" is inside the cutout portion "N-1;"

Position 2: the projection "T-1" is inside the cutout portion "N-2;"

Position 3: the projection "T-1" is inside the cutout portion "N-3;"

Position 4: the projection "T-1" is inside the cutout portion "N-4;"

Position 5: the projection "T-1" is inside the cutout portion "N-5;" and

Position 6: the projection "T-1" is inside the cutout portion "N-6."

For ease of illustration, it may be helpful to define an absolute coordinate system using the center of the center through-hole 278 as an origin for the coordinate system. Referring to FIG. 8, an imaginary line "X" drawn from the origin through the center of the through-hole "A-1" serves as a horizontal axis "X" in the coordinate system. As viewed from the outside, the center of the through-hole "A-1" is located at 0° relative to the horizontal axis "X" in the coordinate system. The center of the through-hole "A-2" is located at 59° relative to the horizontal axis "X", the center of the through-hole "A-3" is located at 118° relative to the horizontal axis "X", the center of the through-hole "A-4" is located at 177° relative to the horizontal axis "X", the center of the through-hole "A-5" is located at 236° relative to the horizontal axis "X", and the center of the through-hole "A-6" is located at 295° relative to the horizontal axis "X". As explained above, the inner end cap 262 may be rotated clockwise and/or counter-clockwise relative to this coordinate system. Thus, the through-holes "A-1" to "A-6" may be positioned at different angles relative to the horizontal axis "X" depending upon in which of the Positions 1-6 the inner end cap 262 is oriented. Table A below lists the angles of the centers of the through-holes "A-1" to "A-6" relative to the horizontal axis "X" for each of the Positions 1-6. The first column of Table A lists the positions illustrated in FIG. 8.

TABLE A

| Through-hole | Position 1 | Position 2 | Position 3 | Position 4 | Position 5 | Position 6 |
| --- | --- | --- | --- | --- | --- | --- |
| A-1 | 0° | 60° | 120° | 180° | 240° | 300° |
| A-2 | 59° | 119° | 179° | 239° | 299° | 359° |
| A-3 | 118° | 178° | 238° | 298° | 358° | 58° |
| A-4 | 177° | 237° | 297° | 357° | 57° | 117° |
| A-5 | 236° | 296° | 356° | 56° | 116° | 176° |
| A-6 | 295° | 355° | 55° | 115° | 175° | 235° |

Thus, in the embodiment illustrated, the through-holes "A-1" to "A-6" may be selectively positioned at the angles provided in Table A above relative to the horizontal axis "X."

Referring to FIGS. 3A-4, the caster mount 264 includes a body portion 300 and a graspable portion 304. The body portion 300 is configured to be received inside the hollow interior 231 of the caster barrel 228 via the second open end portion 234 and to be rotatable therein. The graspable portion 304 configured to be positioned outside the caster barrel 228 when the body portion 300 is received inside the hollow interior 231 of the caster barrel 228.

Figure 10:
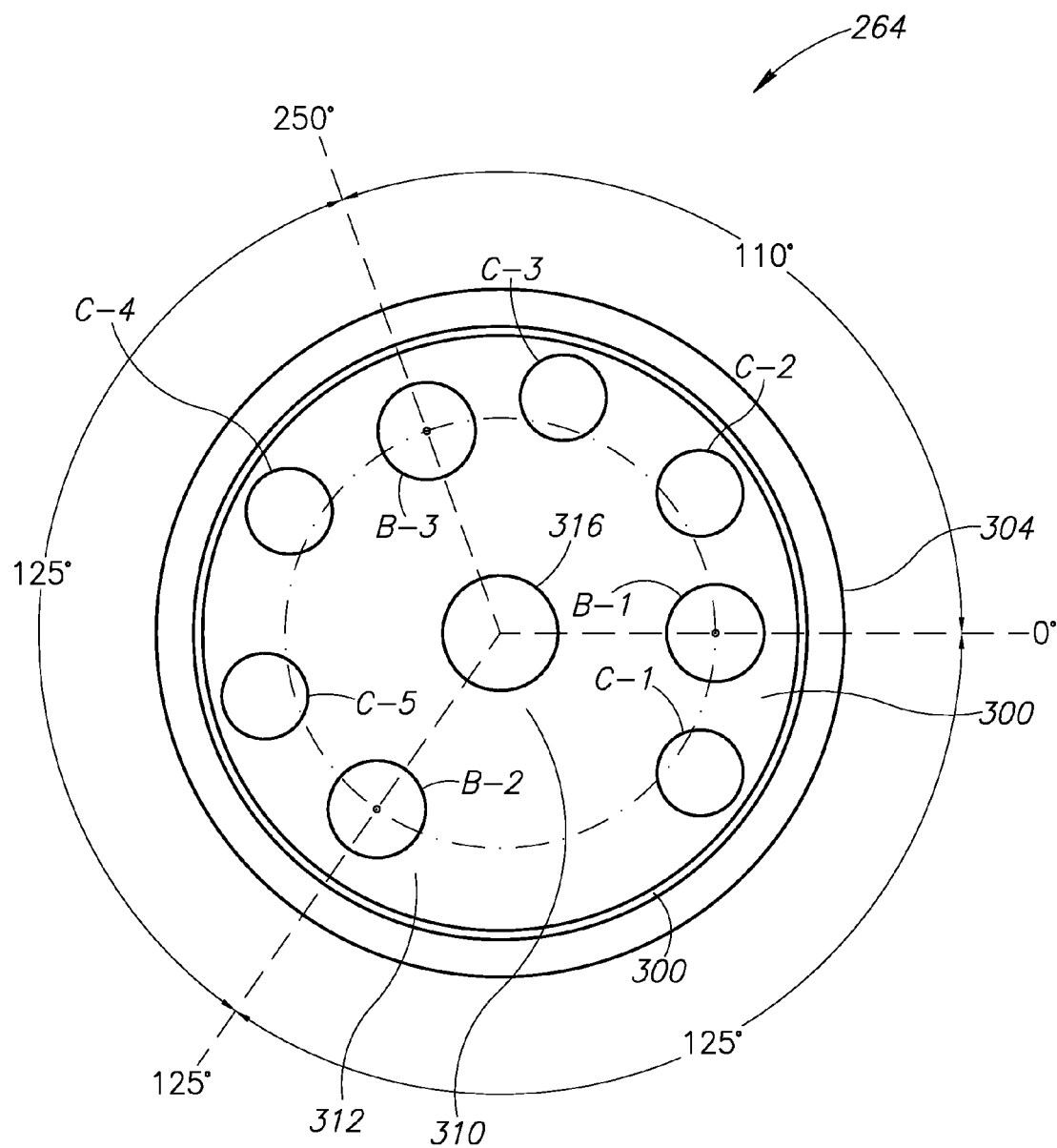
FIG. 10 is a side view of a caster mount of the left angle adjusting caster mount assembly of the wheelchair of FIG. 1.

Referring to FIG. 10, the body portion 300 is generally cylindrical in shape having a center portion 310 surrounded by a peripheral portion 312. A threaded center aperture 316 is formed in the center portion 310. One or more threaded apertures (e.g., threaded apertures "B-1," "B-2," and "B-3") are formed in the body portion 300. In the embodiment illustrated, three threaded apertures "B-1," "B-2," and "B-3" are formed in the peripheral portion 312. The threaded apertures "B-1" and "B-2" are approximately 125° apart. The threaded apertures "B-2" and "B-3" are approximately 125° apart. The threaded apertures "B-3" and "B-1" are approximately 110° apart. Thus, the three threaded apertures "B-1," "B-2," and "B-3" are not equally spaced apart.

Using the coordinate system defined above, when the threaded center aperture 316 is aligned with the center through-hole 278 (see FIGS. 8 and 9) of the inner end cap 262, the center of the threaded aperture "B-1" is located at approximately 0°. In other words, the center of the through-hole "A-1" is aligned with the center of the threaded aperture "B-1." The center of the threaded aperture "B-2" is located at approximately 125°. The center of the threaded aperture "B-3" is located at approximately 250°.

Optionally, one or more apertures (e.g., apertures "C-1" to "C-5") are formed in the body portion 300. For example, five apertures "C-1" to "C-5" may be formed in the peripheral portion 312 of the body portion 300. These apertures may help reduce the weight of the caster mount 264. In other words, the apertures "C-1" to "C-5" may be included to reduce the overall mass of the caster mount 264. Alternatively, the apertures "C-1" to "C-5" may be threaded like the threaded apertures "B-1," "B-2," and "B-3" for purposes of providing smaller increments of adjustment (e.g., increments of adjustment smaller than 1°).

Returning to FIG. 4, the body portion 300 also includes a transverse channel 320 configured to receive the first end portion 181 of the upright pivot pin 180. The transverse channel 320 is configured to limit forward and backward movement of the upright pivot pin 180.

Turning to FIGS. 3A and 3B, a first fastener 330 (such as a threaded bolt) may be used to connect the inner end cap 262 and the caster mount 264 together inside the caster barrel 228. For example, the first fastener 330 may be received inside the center through-hole 278 of the inner end cap 262 and threadedly engage threads (not shown) inside the threaded center aperture 316 of the caster mount 264. When the upright pivot pin 180 has been inserted through the slot 240 (see FIG. 4) and into the transverse channel 320 (see FIG. 4), the first fastener 330 passes through the threaded through-hole 183 formed in the first end portion 181 of the upright pivot pin 180. In this manner, the first fastener 330 retains the upright pivot pin 180 inside the caster mount 264 inside the caster barrel 228.

Both the inner end cap 262 and the caster mount 264 may be rotatable about the first fastener 330. Thus, the first fastener 330 may be aligned along a common axis of rotation for the inner end cap 262 and the caster mount 264.

A second fastener 334 (such as a threaded bolt) may be received inside one of the through-holes "A-1" to "A-6" of the inner end cap 262 and one of the threaded apertures "B-1" to "B-3" of the caster mount 264 to limit rotation of the caster mount 264 relative to the inner end cap 262. Thus, the second fastener 334 may be used to maintain the caster mount 264 in a selected position relative to the inner end cap 262. Further, when the second fastener 334 is adequately tightened, the inner end cap 262 and the caster mount 264 are drawn together inwardly into the hollow interior 231 of the caster barrel 228 which further brings the projections "T-1" to "T-6" into engagement with the cutout portions "N-1" to "N-6" thereby preventing rotation of the inner end cap 262 relative to the caster barrel 228.

The position marker 276 may be used to place the inner end caps 262 of the right and left caster mount assemblies 252 and 254 in the same orientation relative to the caster barrels 226 and 228, respectively. Thus, the right and left caster mount assemblies 252 and 254 provide a means by which the inner end caps 262 may be readily placed in the same orientation. Further, depending upon the implementation details, the location of the end of the second fastener 334 inside one of the through-holes "A-1" to "A-6" may be readily viewed by a user. Thus, the user need only configure one of the right and left caster mount assemblies 252 and 254 and then copy that configuration on the other side.

Figure 13:
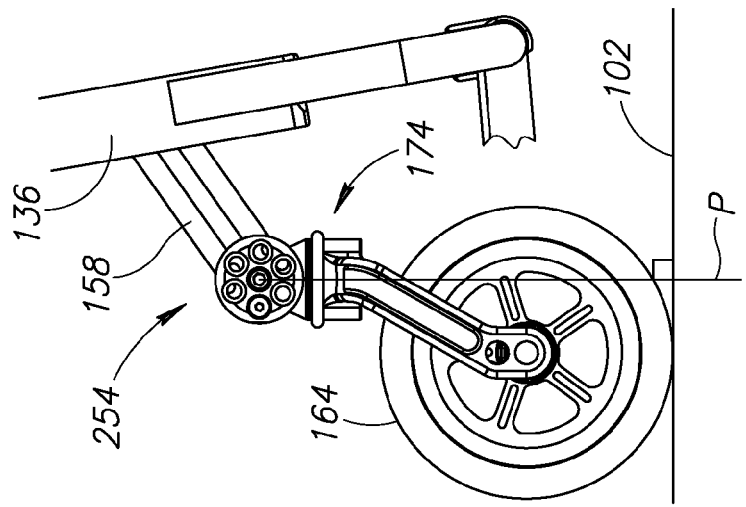
FIG. 13 is a first side view of the left bearing fork assembly and the left angle adjusting caster mount assembly of the wheelchair of FIG. 1 illustrated with the upright pivot pin of the left bearing fork assembly angled perpendicularly with respect to a support surface.
Figure 12:
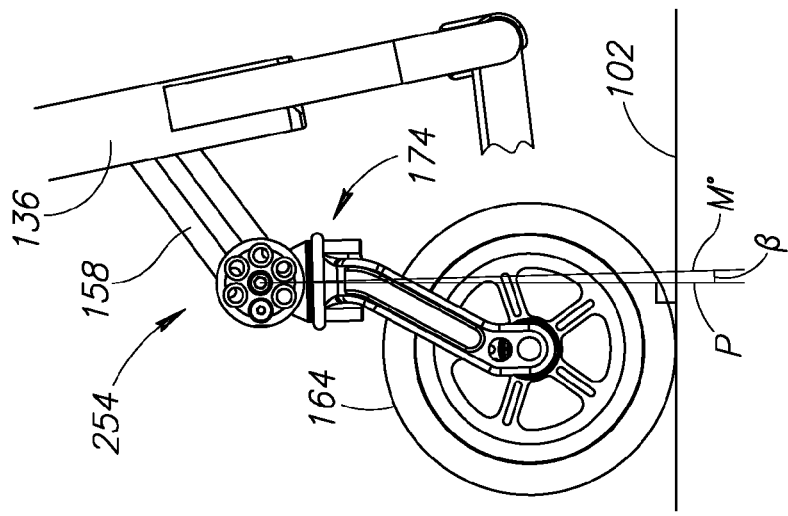
FIG. 12 is a first side view of the left bearing fork assembly and the left angle adjusting caster mount assembly of the wheelchair of FIG. 1 illustrated with the upright pivot pin of the left bearing fork assembly angled forwardly.
Figure 11:
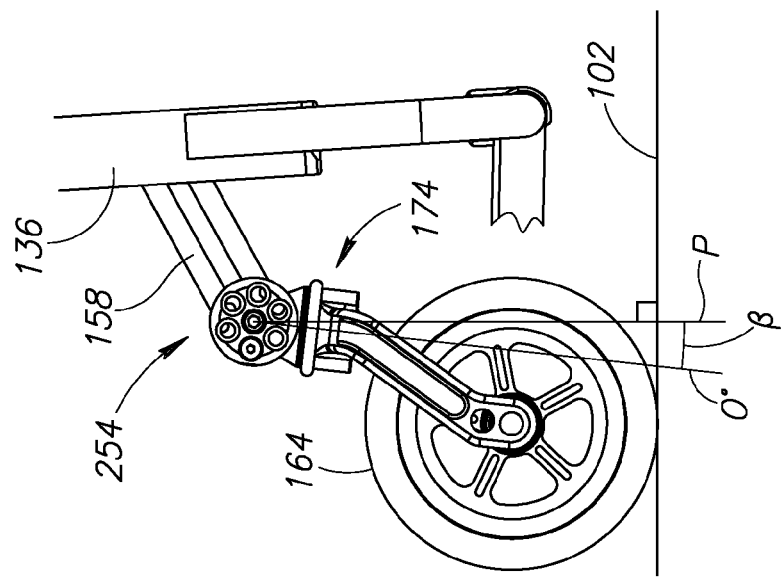
FIG. 11 is a first side view of the left bearing fork assembly and the left angle adjusting caster mount assembly of the wheelchair of FIG. 1 illustrated with an upright pivot pin of the left bearing fork assembly angled rearwardly.

Referring to FIGS. 11-13, as discussed in the Background Section, it is desirable for the upright pivot pin 180 (see FIGS. 3A-4) to be perpendicular to the support surface 102. For illustrative purposes, a reference line "P" that is perpendicular to the support surface 102 has been provided in FIGS. 11-13. The left caster mount assembly 254 may be used to adjust an angle β the upright pivot pin 180 relative to the reference line "P" within a predetermined range of adjustment. For example, the left caster mount assembly 254 may provide approximately 15° of adjustment. The shape and size of the slot 240 (see FIG. 4) may determine at least in part, the size of the predetermined range. However, this is not a requirement.

The left caster mount assembly 254 illustrated is configured to adjust the angle β of the upright pivot pin 180 in substantially uniform increments. In the embodiment illustrated, the left caster mount assembly 254 adjusts the angle β of the upright pivot pin 180 in 1° increments. For example, within a 15° predetermined adjustment range (e.g., 15°), the upright pivot pin 180 may be positioned in fifteen different positions spaced approximately 1° apart.

As is apparent to those of ordinary skill in the art, the angle β the upright pivot pin 180 relative to the reference line "P" is determined at least in part by the orientation of the caster mount 264 relative to the support surface. For illustrative purposes, the rearward most position of the upright pivot pin 180 (illustrated in FIG. 11) will be referred to as 0° within the predetermined range of adjustment. The forward most position of the upright pivot pin 180 will be referred to as "M°" within the predetermined range of adjustment. In embodiments in which the predetermined range of adjustment is about 15°, M is equal to 15.

In the embodiment illustrated in the drawings, rotating the caster mount 264 in a counter-clockwise direction rotates the upright pivot pin 180 forwardly (i.e., toward M°) and rotating the caster mount 264 in a clockwise direction rotates the upright pivot pin 180 rearwardly (i.e., toward 0°). For example, rotating the caster mount 264 by 1° in the counter-clockwise direction rotates the upright pivot pin 180 forwardly 1°. Similarly, rotating the caster mount 264 by 1° in the clockwise direction rotates the upright pivot pin 180 rearwardly 1°.

For ease of illustration, when the threaded aperture "B-1" is aligned with the through-hole "A-1," the upright pivot pin 180 will be described as being in the rearward most position (0°) illustrated in FIG. 11. When the predetermined range of adjustment is about 15° and the adjustment increment is 1°, the upright pivot pin 180 may be positioned at 0°, 1°, 2° . . . 15°.

Referring to Table A above, when the inner end cap 262 is in Position 1, the caster mount 264 may be rotated to align threaded aperture "B-1" with the through-hole "A-1." As explained above, in this configuration, the upright pivot pin 180 is angled in its most rearward position (0°). This position of the caster mount 264 will referred to as an initial position. The caster mount 264 may be rotated 7° in the counter-clockwise direction from the initial position to align the threaded aperture "B-2" with the through-hole "A-3" (i.e., 125°−7°=118°). Further, the caster mount 264 may be rotated 14° in the counter-clockwise direction from the initial position to align the threaded aperture "B-3" with the through-hole "A-5" (i.e., 250°−14°=236°). Thus, when the inner end cap 262 is in Position 1, the upright pivot pin 180 may be positioned at 0°, 7°, and 14°.

When the inner end cap 262 is in Position 2, the threaded aperture "B-1" may be rotated 5° in the counter-clockwise direction from the initial position to align the threaded aperture "B-1" with the through-hole "A-6" (i.e., 0°−5°=355°). Further, the caster mount 264 may be rotated 6° in the counter-clockwise direction from the initial position to align the threaded aperture "B-2" with the through-hole "A-2" (i.e., 125°−6°=119°). Further, the caster mount 264 may be rotated 13° in the counter-clockwise direction from the initial position to align the threaded aperture "B-3" with the through-hole "A-4" (i.e., 250°−13°237°). Thus, when the inner end cap 262 is in Position 2, the upright pivot pin 180 may be positioned at 5°, 6°, and 13°.

When the inner end cap 262 is in Position 3, the threaded aperture "B-1" may be rotated 4° in the counter-clockwise direction from the initial position to align the threaded aperture "B-1" with the through-hole "A-5" (i.e., 0°−4°=356°). Further, the caster mount 264 may be rotated 5° in the counter-clockwise direction from the initial position to align the threaded aperture "B-2" with the through-hole "A-1" (i.e., 125°−5°=120°). Further, the caster mount 264 may be rotated 12° in the counter-clockwise direction from the initial position to align the threaded aperture "B-3" with the through-hole "A-3" (i.e., 250°−12°=238°). Thus, when the inner end cap 262 is in Position 3, the upright pivot pin 180 may be positioned at 4°, 5°, and 12°.

When the inner end cap 262 is in Position 4, the threaded aperture "B-1" may be rotated 3° in the counter-clockwise direction from the initial position to align the threaded aperture "B-1" with the through-hole "A-4" (i.e., 0°−3°=357°). Further, the caster mount 264 may be rotated 10° in the counter-clockwise direction from the initial position to align the threaded aperture "B-2" with the through-hole "A-6" (i.e., 125°−10°=115°). Further, the caster mount 264 may be rotated 11° in the counter-clockwise direction from the initial position to align the threaded aperture "B-3" with the through-hole "A-2" (i.e., 250°−11°=239°). Thus, when the inner end cap 262 is in Position 4, the upright pivot pin 180 may be positioned at 3°, 10°, and 11.°

When the inner end cap 262 is in Position 5, the threaded aperture "B-1" may be rotated 2° in the counter-clockwise direction from the initial position to align the threaded aperture "B-1" with the through-hole "A-3" (i.e., 0°−2°=358°). Further, the caster mount 264 may be rotated 9° in the counter-clockwise direction from the initial position to align the threaded aperture "B-2" with the through-hole "A-5" (i.e., 125°−9°=116°). Further, the caster mount 264 may be rotated 10° in the counter-clockwise direction from the initial position to align the threaded aperture "B-3" with the through-hole "A-1" (i.e., 250°−10°=240°). Thus, when the inner end cap 262 is in Position 5, the upright pivot pin 180 may be positioned at 2°, 9°, and 10.°

When the inner end cap 262 is in Position 6, the threaded aperture "B-1" may be rotated 1° in the counter-clockwise direction from the initial position to align the threaded aperture "B-1" with the through-hole "A-2" (i.e., 0°−1°=359°). Further, the caster mount 264 may be rotated 8° in the counter-clockwise direction from the initial position to align the threaded aperture "B-2" with the through-hole "A-4" (i.e., 125°−8°=117°). Further, the caster mount 264 may be rotated 15° in the counter-clockwise direction from the initial position to align the threaded aperture "B-3" with the through-hole "A-6" (i.e., 250°−15°=235°). Thus, when the inner end cap 262 is in Position 6, the upright pivot pin 180 may be positioned at 1°, 8°, and 15°.

As discussed in the Background Section, in some wheelchairs, the height of the seat 138 relative to the support surface 102 may be adjusted. This may be achieved by adjusting the position of the axle assemblies 146 of the right and left rear wheels 142 and 144 relative to the frame 120. In the embodiment illustrated, each of the right and left rear wheel mounting assemblies 152 and 154 are configured to adjust the position of the axle assemblies 146 of the right and left rear wheels 142 and 144 relative to the frame 120. Specifically, the right rear wheel mounting assembly 152 is configured to selectively raise and lower the right side portion 122 of the frame 120 relative to the axle assembly 146 of the right rear wheel 142, and the left rear wheel mounting assembly 154 is configured to selectively raise and lower the left side portion 124 of the frame 120 relative to the axle assembly 146 of the left rear wheel 144 to thereby changing the position of the frame 120 relative to the support surface 102.

Figure 14:
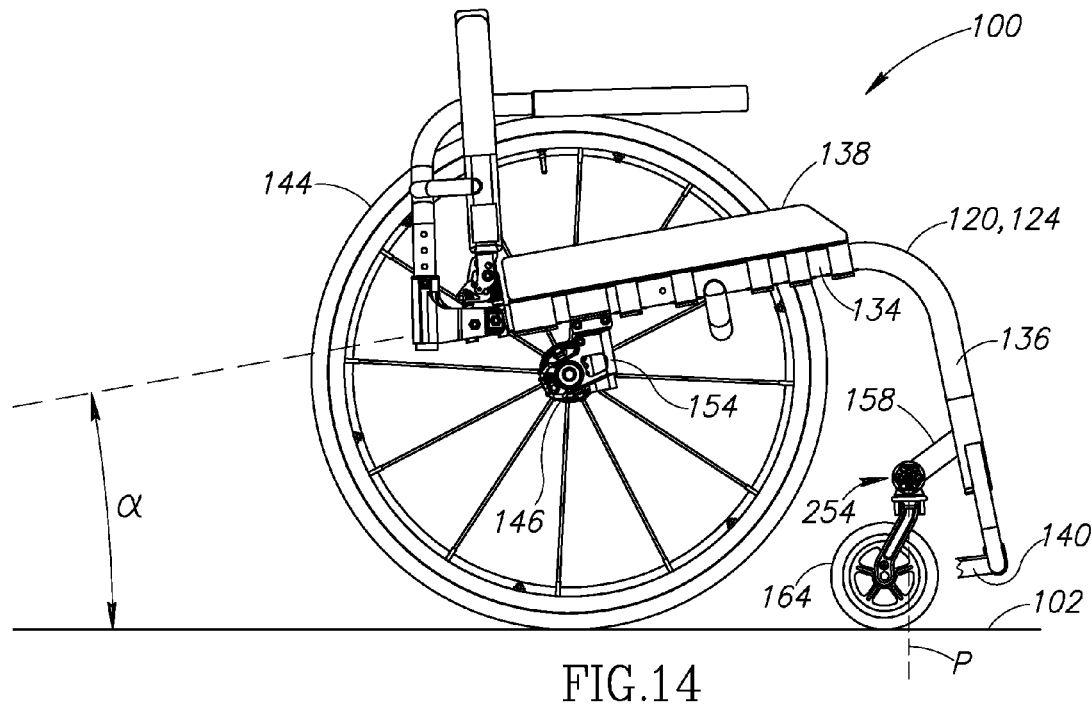
FIG. 14 is a sectional view of the wheelchair of FIG. 1 having its left rear wheel in a first position relative to a frame.
Figure 15:
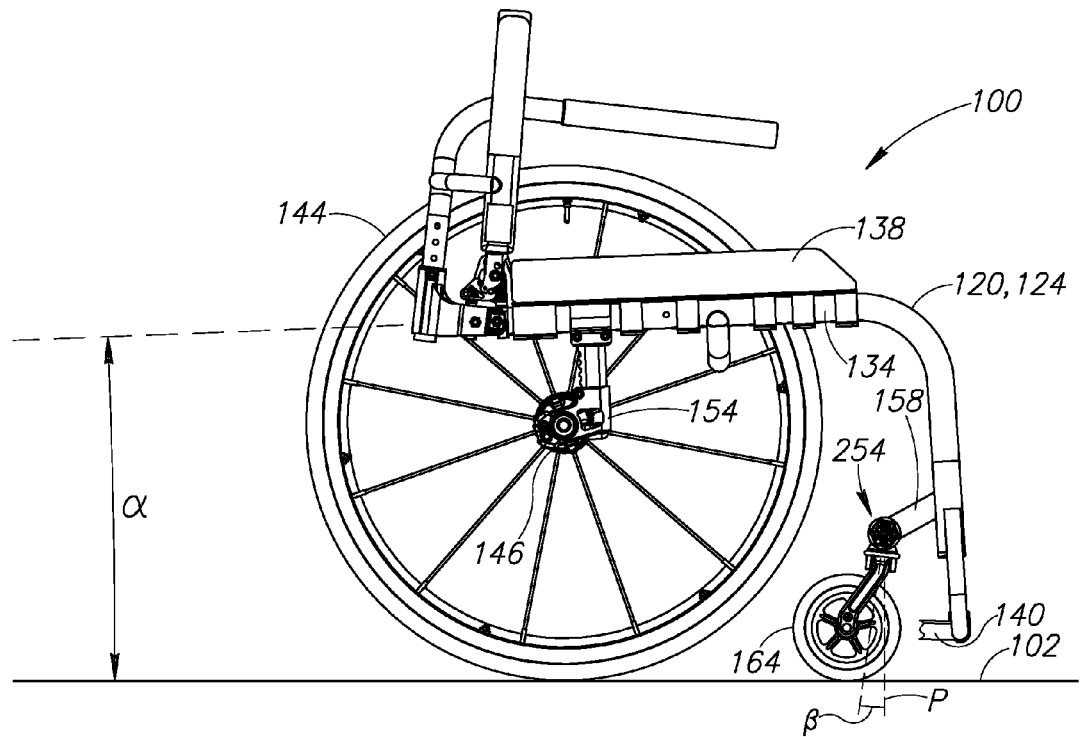
FIG. 15 is a sectional view of the wheelchair of FIG. 1 having its left rear wheel in a second position relative to the frame.

Referring to FIGS. 14 and 15, adjusting the position of the right rear wheel 142 (see FIG. 1) and the left rear wheel 144 relative to the frame 120 changes an angle "a" of the frame 120 relative to the support surface 102. For ease of illustration, the angle "a" has been defined between the horizontally extending portion 134 of the left support member 128 and the support surface 102. Depending upon the implementation details, an angle of the seat 138 relative to the support surface 102 may be approximately equal to the angle "a," but this is not a requirement.

In FIG. 14, the left rear wheel mounting assembly 154 is configured to position the axle assembly 146 of the left rear wheel 144 at a first distance from the frame 120. While not illustrated in FIG. 14, the right rear wheel mounting assembly 152 may be configured to position the axle assembly 146 of the right rear wheel 142 at a distance from the frame 120 that is substantially equal to the first distance. In this configuration, the upright pivot member 180 (see FIGS. 3A-4) may be substantially perpendicular to the support surface 102 (i.e., the angle "β" is substantially 0°).

In FIG. 15, the left rear wheel mounting assembly 154 is configured to position the axle assembly 146 of the left rear wheel 144 at a second distance that is greater than the first distance illustrated in FIG. 14. Thus, in FIG. 15, the angle "a" is larger than in FIG. 14. While not illustrated in FIG. 15, the right rear wheel mounting assembly 152 may be configured to position the axle assembly 146 of the right rear wheel 142 at a distance from the frame 120 that is substantially equal to the second distance that the axle assembly 146. In this configuration, the upright pivot member 180 (see FIGS. 3A-4) is not substantially perpendicular to the support surface 102 (i.e., the angle "β" is greater than or less than 0°). When the upright pivot member 180 (see FIGS. 3A-4) is not substantially perpendicular to the support surface 102 (i.e., the angle "β" is greater than or less than 0°), the left caster mount assembly 254 described above may be used to rotate the upright pivot member forwardly or rearwardly (i.e., to adjust the angle "β") as appropriate to position the upright pivot member 180 perpendicular to the support surface 102.

Figure 16:
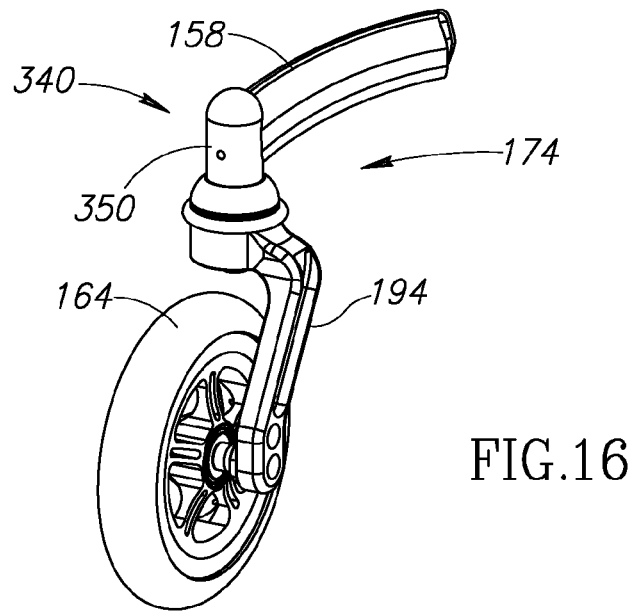
FIG. 16 is a perspective view an embodiment of a left caster mount assembly that is not configured to adjust the angle of the upright pivot pin of the left bearing fork assembly relative to the support surface.
Figure 17:
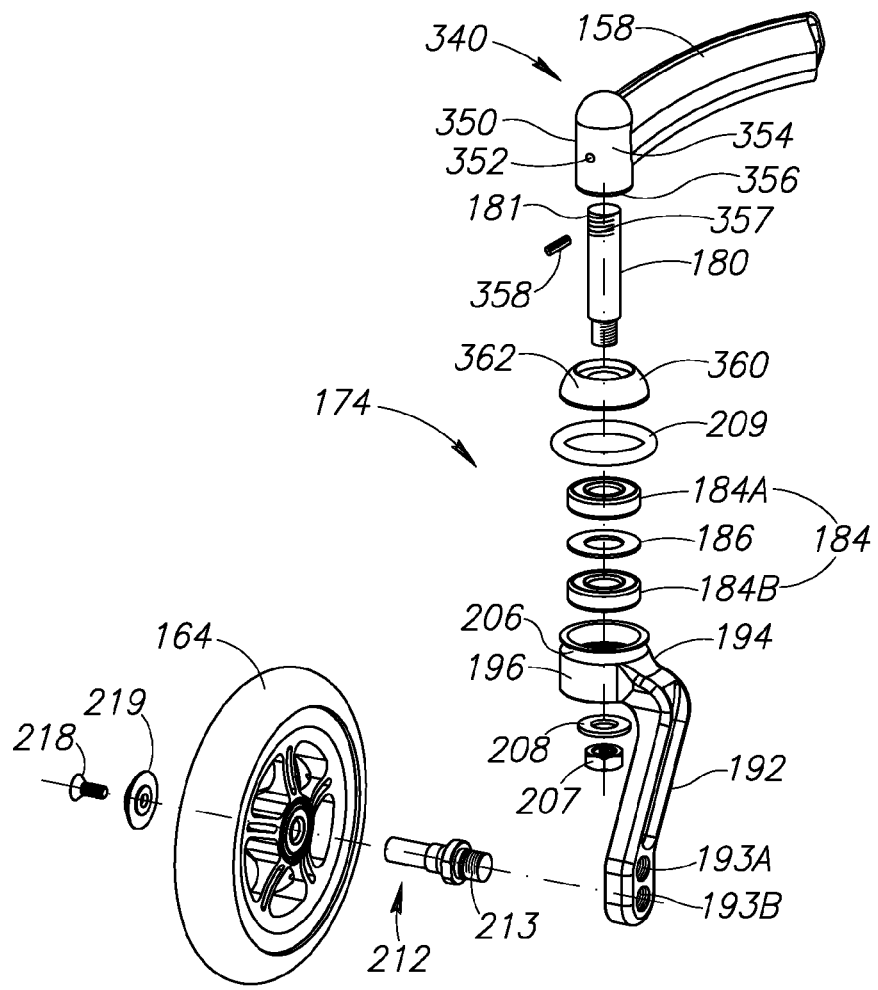
FIG. 17 is an exploded view of the left caster mount assembly of FIG. 16.

Alternatively, referring to FIGS. 16 and 17, the left bearing fork assembly 174 may be connected to the wheelchair 100 (see FIGS. 1 and 2) by a caster mount assembly 340 that is not configured to adjust the angle of the upright pivot pin 180 relative to the support surface 102. Because the right and left bearing fork assemblies 172 and 174 are mirror images of one another, for the sake of brevity, only the left bearing fork assembly 174 has been illustrated in FIGS. 16 and 17 and will be described in detail. However, those of ordinary skill in the art appreciate that the right bearing fork assembly 172 may be connected to the wheelchair 100 (see FIGS. 1 and 2) by a caster mount assembly that is substantially similar to or a mirror image of the caster mount assembly 340.

In such embodiments, instead of the caster barrels 226 and 228, a separate upright collar or caster barrel 350 may be coupled to each of the right and left connecting struts 156 and 158. In the embodiment illustrated in FIGS. 16 and 17, the right connecting strut 156 (see FIG. 2) is curved and extends between a first caster barrel 350 and the generally downwardly extending portion 132 (see FIG. 2) of the right frame member 126 (see FIG. 2). Similarly, the left connecting strut 158 is curved and extends between a second caster barrel 350 and the generally downwardly extending portion 136 (see FIG. 2) of the right frame member 128 (see FIG. 2).

The caster barrel 350 has a substantially hollow tube shape with a transverse threaded through-hole 352 formed in an outer sidewall 354. The sidewall 354 has an open lower end 356 configured to receive the first end portion 181 of the upright pivot pin 180 into the interior of the caster barrel 350. The inside of the sidewall 354 may include inside threads (not shown). In this embodiment, the first end portion 181 may include outside threads 357. Thus, the first end portion 181 may be threaded into the open lower end 356 of the sidewall 354. A set screw 358 may inserted into the transverse threaded through-hole 352 to maintain the upright pivot pin 180 inside the caster barrel 350. In this embodiment, the transverse threaded through-hole 183 (see FIG. 4) may be omitted from the upright pivot pin 180. A chemical bonding agent or adhesive, such as LOCTITE® 262 Threadlocker, may be used to permanently bond the threaded first end portion 181 of the upright pivot pin 180 inside the caster barrel 350.

The left bearing fork assembly 174 illustrated in FIGS. 16 and 17 includes a top cap 360 that differs slightly from the top cap 176 of the left bearing fork assembly 174 illustrated in FIGS. 3A and 3B. Specifically, the top cap 360 includes a generally dome shaped upper surface 362, instead of the contoured upper surface 179 of the top cap 176.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A caster mount assembly comprising:
a first rotatable body having a first plurality of non-uniformly spaced apart apertures;
a second rotatable body having a second plurality of non-uniformly spaced apart apertures, the first rotatable body and the second rotatable body being rotatable relative to one another along a common axis of rotation to align a selected one of the first apertures with a selected one of the second apertures;
a coupler configured to non-rotatably couple the first rotatable body to the second rotatable body after the selected one of the first apertures has been aligned with the selected one of the second apertures; and
a bearing fork assembly non-rotatably coupled to the second rotatable body for rotation therewith.

2. The caster mount assembly of claim 1, wherein the coupler is a first coupler, and the caster mount assembly further comprises:
a second coupler configured to rotatably couple the first rotatable body to the second rotatable body, the first coupler being configured to allow the first and second rotatable bodies to rotate relative to one another about the common axis of rotation to position the first rotatable body relative to the second rotatable body.

3. The caster mount assembly of claim 1, wherein the first plurality of non-uniformly spaced apart apertures are positioned in a first substantially circular arrangement and comprise:
a first aperture;
a second aperture spaced about 59 degrees from the first aperture within the first substantially circular arrangement;
a third aperture spaced about 59 degrees from the second aperture within the first substantially circular arrangement;
a fourth aperture spaced about 59 degrees from the third aperture within the first substantially circular arrangement;
a fifth aperture spaced about 59 degrees from the fourth aperture within the first substantially circular arrangement; and
a sixth aperture spaced about 59 degrees from the fifth aperture within the first substantially circular arrangement, the sixth aperture spaced about 65 degrees from the first aperture within the first substantially circular arrangement.

4. The caster mount assembly of claim 3, wherein the second plurality of non-uniformly spaced apart apertures are positioned in a second substantially circular arrangement and comprise:
a first aperture;
a second aperture spaced about 125 degrees from the first aperture within the second substantially circular arrangement; and
a third aperture spaced about 125 degrees from the second aperture within the second substantially circular arrangement, the third aperture spaced about 110 degrees from the first aperture within the second substantially circular arrangement.

5. The caster mount assembly of claim 4, wherein the first rotatable body comprises a first central aperture positioned on the common axis of rotation, the second rotatable body comprises a second central aperture positioned on the common axis of rotation, and the caster mount assembly further comprises:

an elongated fastener extending along the common axis of rotation, the fastener extending through the first central aperture and into the second central aperture to rotatably couple the first rotatable body to the second rotatable body, the fastener allowing the first and second rotatable bodies to rotate relative to one another about the common axis of rotation to position the first rotatable body relative to the second rotatable body.

6. The caster mount assembly of claim 1, wherein the first rotatable body comprises a marker portion indicating the orientation of the first rotatable body.

7. A wheelchair for use on support surface, the wheelchair comprising:

a frame;

a first caster barrel coupled to the frame, the first caster barrel having a first substantially cylindrically shaped sidewall, the first sidewall having a first open end opposite a second open end and a slot positioned between the first and second open ends;

a first rotatable body having a first portion receivable inside the first open end of the first sidewall of the first caster barrel, the first portion of the first rotatable body being rotatable inside the first open end of the first sidewall of the first caster barrel about a first axis of rotation, the first rotatable body comprising a first plurality of non-uniformly spaced apart apertures;

a second rotatable body having a first portion receivable inside the second open end of the second sidewall of the first caster barrel, the first portion of the second rotatable body being rotatable inside the second open end of the first sidewall of the first caster barrel about the first axis of rotation, the second rotatable body comprising a second plurality of non-uniformly spaced apart apertures and a transverse aperture adjacent the slot of the first sidewall of the first caster barrel when the first portion of the second rotatable body is received inside the second open end of the first sidewall of the first caster barrel;

a first fastener configured to non-rotatably couple a selected one of the first apertures with a selected one of the second apertures; and a first bearing fork assembly having a portion extending into the slot of the first sidewall of the first caster barrel and into the transverse aperture of the second rotatable body, the portion of the first bearing fork assembly being coupled inside the transverse aperture of the second rotatable body for rotation with the second rotatable body as the second rotatable body rotates inside the second open end of the first sidewall of the first caster barrel to determine an angle of the first bearing fork assembly relative to the support surface.

8. The wheelchair of claim 7, wherein the first rotatable body has a graspable portion non-rotatably coupled to the first portion, the graspable portion being positioned outside the first sidewall of the first caster barrel and configured to be gripped and rotated to align the selected one of the first apertures with the selected one of the second apertures.

9. The wheelchair of claim 7, wherein the second rotatable body has a graspable portion non-rotatably coupled to the first portion, the graspable portion being positioned outside the first sidewall of the first caster barrel and configured to be gripped and rotated to align the selected one of the second apertures with the selected one of the first apertures.

10. The wheelchair of claim 7, wherein the first apertures are positioned such that at least a selected one of the first apertures is alignable with at least one of the second apertures every one degree of rotation about the first axis of rotation within a predetermined range of adjustment.

11. The wheelchair of claim 10, wherein the predetermined range of adjustment is approximately fifteen degrees.

12. The wheelchair of claim 7, wherein the first plurality of non-uniformly spaced apart apertures are positioned in a first substantially circular arrangement and comprise:

a first aperture;

a second aperture spaced about 59 degrees from the first aperture within the first substantially circular arrangement;

a third aperture spaced about 59 degrees from the second aperture within the first substantially circular arrangement;

a fourth aperture spaced about 59 degrees from the third aperture within the first substantially circular arrangement;

a fifth aperture spaced about 59 degrees from the fourth aperture within the first substantially circular arrangement; and a sixth aperture spaced about 59 degrees from the fifth aperture within the first substantially circular arrangement, the sixth aperture being spaced apart from the about 65 degrees from the first aperture.

13. The wheelchair of claim 12, wherein the second plurality of non-uniformly spaced apart apertures are positioned in a second substantially circular arrangement and comprise:

a first aperture;

a second aperture spaced about 125 degrees from the first aperture within the second substantially circular arrangement; and a third aperture spaced about 125 degrees from the second aperture within the second substantially circular arrangement, the third aperture spaced about 110 degrees from the first aperture within the second substantially circular arrangement.

14. The wheelchair of claim 7, wherein the first rotatable body comprises a first central aperture positioned on the first axis of rotation, the second rotatable body comprises a second central aperture positioned on the first axis of rotation, and the wheelchair further comprises:

an elongated fastener extending along the first axis of rotation, the fastener extending through the first central aperture and into the second central aperture to rotatably couple the first rotatable body to the second rotatable body, the fastener allowing the first and second rotatable bodies to rotate relative to one another about the first axis of rotation to position the first rotatable body relative to the second rotatable body.

15. The wheelchair of claim 7, wherein a plurality of cutout portions are formed in the first open end of the first sidewall of the first caster barrel, and the first rotatable body comprises a plurality of projections configured to be received inside the cutout portions to non-rotatably connect the first rotatable body to the first open end of the first sidewall of the first caster barrel.

16. The wheelchair of claim 15, wherein the cutout portions are spaced apart uniformly along the first open end of the first sidewall of the first caster barrel.

17. The wheelchair of claim 7, wherein the first rotatable body comprises a marker portion indicating the orientation of the first rotatable body relative to the first caster barrel.

18. The wheelchair of claim 7, further comprising:

a second caster barrel coupled to the frame, the second caster barrel having a second substantially cylindrically shaped sidewall, the second sidewall having a first open end opposite a second open end and a slot positioned between the first and second open ends;

a third rotatable body having a first portion receivable inside the first open end of the second sidewall of the second caster barrel, the first portion of the third rotatable body being rotatable inside the first open end of the second sidewall of the second caster barrel about a second axis of rotation, the third rotatable body comprising a third plurality of non-uniformly spaced apart apertures;

a fourth rotatable body having a first portion receivable inside the second open end of the second sidewall of the second caster barrel, the first portion of the fourth rotatable body being rotatable inside the second open end of the second sidewall of the second caster barrel about the second axis of rotation, the fourth rotatable body comprising a fourth plurality of non-uniformly spaced apart apertures and a transverse aperture adjacent the slot of the second sidewall of the second caster barrel when the first portion of the fourth rotatable body is received inside the second open end of the second sidewall of the second caster barrel;

a second fastener configured to non-rotatably couple a selected one of the third apertures with a selected one of the fourth apertures; and a second bearing fork assembly having a portion extending into the slot of the second sidewall of the second caster barrel and into the transverse aperture of the fourth rotatable body, the portion of the second bearing fork assembly being coupled inside the transverse aperture of the fourth rotatable body for rotation with the fourth rotatable body as the fourth rotatable body rotates inside the second open end of the second sidewall of the second caster barrel to determine an angle of the second bearing fork assembly relative to the support surface.

19. The wheelchair of claim 18, wherein the first rotatable body comprises a first marker portion indicating the orientation of the first rotatable body relative to the first caster barrel and the third rotatable body comprises a second marker portion indicating the orientation of the third rotatable body relative to the second caster barrel.

20. The wheelchair of claim 18, wherein the first bearing fork assembly comprises a first fork rotatably couplable to a first wheel, the first fork having one tine or a pair of spaced apart tines, and the second bearing fork assembly comprises a second fork rotatably couplable to a second wheel, the second fork having one tine or a pair of spaced apart tines.

21. The wheelchair of claim 7, further comprising:
a first rear wheel coupled to the frame and configured to be positionable relative thereto; and
a second rear wheel coupled to the frame and configured to be positionable relative thereto, the positions of the first and second rear wheels relative to the frame determining at least in part an angle of the frame relative to the support surface.

22. The wheelchair of claim 7, wherein the first bearing fork assembly comprises a mono-fork rotatably couplable to a first front wheel by a first axle, the mono-fork comprising a single tine having a threaded aperture with inside threads formed therein, the first axle having a threaded distal end portion with outside threads formed thereon configured to threadedly engage the inside threads of the threaded aperture.

23. The wheelchair of claim 22, wherein the first bearing fork assembly further comprises an end cap and a fastener having outside threads formed thereon, the first axle having a proximal end portion with inside threads formed therein configured to be threadedly engaged the outside threads of the fastener, the fastener being configured to position the end cap against a side portion of the first front wheel to maintain the first front wheel on the first axle.

24. The wheelchair of claim 22, wherein the mono-fork comprises a substantially cylindrically shaped collar portion coupled to the tine, the collar having an outside circumferentially extending groove formed therein, and the wheelchair further comprises a bumper configured to be received inside the groove, the portion of the first bearing fork assembly extending into the slot of the first sidewall of the first caster barrel extending through the collar and being rotatably coupled thereto.

25. The wheelchair of claim 7, wherein the first bearing fork assembly comprises a mono-fork rotatably couplable to a first front wheel by a first axle, the mono-fork comprising a single tine having a threaded aperture with inside threads formed therein, the first axle having a threaded distal end portion permanently bonded inside the threaded aperture.

* * * * *